(12) United States Patent
Wang

(10) Patent No.: US 12,206,841 B2
(45) Date of Patent: Jan. 21, 2025

(54) VIDEO DECODING METHOD, VIDEO ENCODING METHOD, RELATED DEVICES, AND STORAGE MEDIUM

(71) Applicant: TENCENT TECHNOLOGY (SHENZHEN) COMPANY LIMITED, Guangdong (CN)

(72) Inventor: Yingbin Wang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 310 days.

(21) Appl. No.: 17/977,589

(22) Filed: Oct. 31, 2022

(65) Prior Publication Data

US 2023/0047433 A1    Feb. 16, 2023

Related U.S. Application Data

(63) Continuation of application No. PCT/CN2021/131183, filed on Nov. 17, 2021.

(30) Foreign Application Priority Data

Dec. 5, 2020  (CN) .......................... 202011416242.0

(51) Int. Cl.
   *H04N 19/105*  (2014.01)
   *H04N 19/159*  (2014.01)
   (Continued)

(52) U.S. Cl.
   CPC ......... *H04N 19/105* (2014.11); *H04N 19/159* (2014.11); *H04N 19/182* (2014.11); *H04N 19/46* (2014.11)

(58) Field of Classification Search
   CPC .. H04N 19/105; H04N 19/129; H04N 19/176; H04N 19/182; H04N 19/11;
   (Continued)

(56) References Cited

U.S. PATENT DOCUMENTS

| 2015/0264348 A1* | 9/2015 | Zou ...................... H04N 19/593 |
| | | 375/240.02 |
| 2017/0238001 A1* | 8/2017 | Li .......................... H04N 19/70 |
| 2023/0262226 A1* | 8/2023 | Liu ...................... H04N 19/176 |
| | | 375/240.02 |

FOREIGN PATENT DOCUMENTS

| CN | 104244007 A | 12/2014 |
| CN | 106576163 A | 4/2017 |

(Continued)

OTHER PUBLICATIONS

Ying Chen, et al., "Description of Core Experiment 10 (CE10): Intra String Copy", CE coordinators, Joint Collaborative Team on Video Coding (JCT-VC) of ITU-T SG 16 WP 3 and ISO/IEC JTC 1/SC 29/WG 11, Jun. 30, 2014-Jul. 9, 2014, pp. 1-6.

(Continued)

*Primary Examiner* — Nathnael Aynalem
(74) *Attorney, Agent, or Firm* — Sughrue Mion, PLLC

(57) ABSTRACT

A video decoding method, a video encoding method, related devices, and a storage medium are provided. The video decoding method includes: determining a current string to be decoded from a current coding unit of a current image; based on the current string being a unit vector string and the current string including a first pixel, determining a reference pixel of the first pixel from a historical decoding unit in the current image, the historical decoding unit being a decoded coding unit adjacent to the current coding unit in the current image, the reference pixel of the first pixel being adjacent to the first pixel in the current image; and acquiring a predicted value of the first pixel based on a reconstructed value of the reference pixel of the first pixel to obtain a decoded image.

18 Claims, 9 Drawing Sheets

(51) Int. Cl.
*H04N 19/182* (2014.01)
*H04N 19/46* (2014.01)

(58) Field of Classification Search
CPC .. H04N 19/119; H04N 19/159; H04N 19/172; H04N 19/174; H04N 19/186; H04N 19/46; H04N 19/593; H04N 19/70; H04N 19/59; H04N 19/50
USPC ............................................. 375/240–240.29
See application file for complete search history.

(56) References Cited

FOREIGN PATENT DOCUMENTS

| CN | 107071450 A | 8/2017 |
|----|-------------|--------|
| CN | 107770527 A | 3/2018 |

OTHER PUBLICATIONS

International Search Report for PCT/CN2021/131183 dated Feb. 9, 2022.
Written Opinion for PCT/CN2021/131183 dated Feb. 9, 2022.

\* cited by examiner

LCU: largest coding unit
CU: coding unit

VIDEO DECODING METHOD, VIDEO ENCODING METHOD, RELATED DEVICES, AND STORAGE MEDIUM

CROSS-REFERENCE TO RELATED APPLICATION(S)

This application is a continuation application of International Application No. PCT/CN2021/131183, filed Nov. 17, 2021, which claims priority to Chinese Patent Application No. 2020114162420, filed with the National Intellectual Property Administration, PRC on Dec. 5, 2020, the disclosures of which are herein incorporated by reference in their entireties.

FIELD

The disclosure relates to the field of image processing technologies, and in particular, to video encoding and decoding technology.

BACKGROUND

In video encoding and decoding technology, an encoder side generally first partitions a frame image included in a video into multiple coding units, then obtains bit stream data of the frame image by encoding each coding unit, and then transmits the bit stream data to a decoder side. Correspondingly, after receiving the bit stream data, the decoder side generally performs a decoding operation in units of coding units to obtain decoded images.

With the development of encoding and decoding technology, the concept of a unit vector string has been proposed. The unit vector string has received wide attention due to its advantage of lower implementation complexity. At present, a unit vector string is only used in an equal value string and unit vector string submode included in an intra string copy coding mode in the related art. In addition, during encoding and decoding of a coding unit based on a unit vector string, only a pixel inside the coding unit can be used as a reference. In this encoding and decoding method, some strings (for example, strings in the first row) in a coding unit are restricted from being used as unit vector strings. It can be seen that the application range of a unit vector string is limited to a certain extent in the related art, and as a result the encoding and decoding performance is affected.

SUMMARY

Example embodiments of the disclosure provide a video decoding method, a video encoding method, related devices, and a storage medium, which may effectively expand the application range of a unit vector string, thereby improving the encoding and decoding performance.

According to an aspect of the disclosure, the embodiments of the disclosure provide a video decoding method, the method including:

determining a current string to be decoded from a current coding unit of a current image;

based on the current string being a unit vector string and the current string including a first pixel, determining a reference pixel of the first pixel from a historical decoding unit in the current image, the historical decoding unit being a decoded coding unit adjacent to the current coding unit in the current image, the reference pixel of the first pixel being adjacent to the first pixel in the current image; and acquiring a predicted value of the first pixel according to a reconstructed value of the reference pixel of the first pixel to obtain a decoded image.

According to an aspect of the disclosure, the embodiments of the disclosure provide a video encoding method, the method including:

determining a current string to be encoded from a current coding unit of a current image;

based on the current string being a unit vector string and the current string including a first pixel, determining a reference pixel of the first pixel from a historical coding unit in the current image, the historical coding unit being an encoded coding unit adjacent to the current coding unit in the current image, the reference pixel of the first pixel being adjacent to the first pixel in the current image; and acquiring a predicted value of the first pixel according to a reconstructed value of the reference pixel of the first pixel to obtain coding information of the current coding unit.

According to an aspect of the disclosure, the embodiments of the disclosure provide a video decoding apparatus, the apparatus including:

at least one memory configured to store program code; and at least one processor configured to read the program code and operate as instructed by the program code, the program code including:

acquisition code configured to cause the at least one processor to determine a current string to be decoded from a current coding unit of a current image; and decoding code configured to cause the at least one processor to: based on the current string being a unit vector string and the current string comprising a first pixel, determine a reference pixel of the first pixel from a historical decoding unit in the current image, the historical decoding unit being a decoded coding unit adjacent to the current coding unit in the current image, the reference pixel of the first pixel being adjacent to the first pixel in the current image, the decoding code being further configured to cause the at least one processor to acquire a predicted value of the first pixel based on a reconstructed value of the reference pixel of the first pixel to obtain a decoded image.

According to an aspect of the disclosure, the embodiments of the disclosure provide a video encoding apparatus, the apparatus including:

at least one memory configured to store program code; and at least one processor configured to read the program code and operate as instructed by the program code, the program code including:

acquisition code configured to cause the at least one processor to determine a current string to be encoded from a current coding unit of a current image; and encoding code configured to cause the at least one processor to: based on the current string being a unit vector string and the current string including a first pixel, determine a reference pixel of the first pixel from a historical coding unit in the current image, the historical coding unit being an encoded coding unit adjacent to the current coding unit in the current image, the reference pixel of the first pixel being adjacent to the first pixel in the current image, the encoding code being further configured to cause the at least one processor to acquire a predicted value of the first pixel according to a reconstructed value of the reference pixel of the first pixel to obtain coding information of the current coding unit.

According to an aspect of the disclosure, the embodiments of the disclosure provide a computer device, the computer device including an input interface and an output interface, the computer device further including:

a processor, suitable for implementing one or more instructions; and a computer storage medium, the computer storage medium storing one or more first instructions, the one or more first instructions being suitable to be loaded by the processor to perform the foregoing video decoding method according to an aspect of the disclosure or the foregoing video encoding method according to an aspect of the disclosure.

According to an aspect of the disclosure, the embodiments of the disclosure the disclosure provide a computer storage medium, the computer storage medium storing one or more first instructions, the one or more first instructions being suitable to be loaded by the processor to perform the foregoing video decoding method according to an aspect of the disclosure; or storing one or more second instructions, the one or more second instructions being suitable to be loaded by the processor, to perform the foregoing video encoding method according to an aspect of the disclosure.

According to an aspect of the disclosure, the embodiments of the disclosure provide a computer program product, including instructions, the instructions, when being run on a computer, causing the computer to perform the foregoing video decoding method according to an aspect of the disclosure or the foregoing video encoding method according to an aspect of the disclosure.

DETAILED DESCRIPTION

The following clearly and completely describes technical solutions in example embodiments of the disclosure with reference to the accompanying drawings in the embodiments of the disclosure.

Figure 1A:
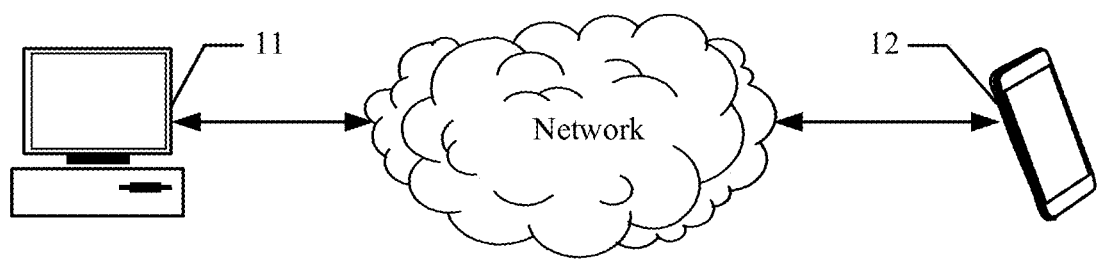
FIG. 1a is a schematic architectural diagram of an image processing system according to an embodiment of the disclosure.

The embodiments of the disclosure relate to an image processing system. Referring to FIG. 1a, the image processing system includes at least a video encoding device 11 and a video decoding device 12. The video encoding device 11 includes at least a video encoder. The video encoder is configured to encode an image in a video signal to obtain a bit stream. The video decoding device 12 includes at least a video decoder. The video decoder is configured to decode the bit stream to obtain a reconstructed image corresponding to the image in the video signal. For an obtaining manner of the video signal herein, a video signal may be photographed by a camera and generated by a computer. Due to different statistical characteristics, compression coding modes corresponding to the manners may be different.

Figure 1B:
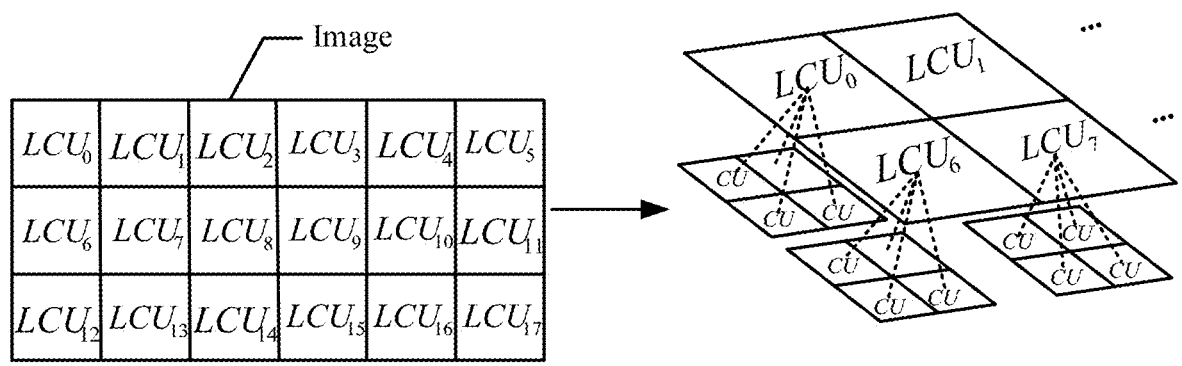
FIG. 1B is a schematic diagram of partitioning an image into a plurality of coding units according to an embodiment of the disclosure.

Current mainstream video coding standards include, for example, international video coding standards such as High Efficiency Video Coding (HEVC) and Versatile Video Coding (VVC) and Chinese video coding standards such as Audio Video coding Standard 3 (AVS3). An image in a raw video signal is partitioned into a series of coding units (CUs) by using a hybrid coding framework, and a video coding manner such as prediction, transform, and entropy coding to implement the compression of video data. Specifically, a series of operations and processing usually need to be performed on an image in an inputted raw video signal in these mainstream video coding standards:

1). Block Partition Structure: An inputted image is partitioned into a plurality of non-overlapping processing units. Similar compression operations are performed on each processing unit. The each processing unit is referred to as a coding tree unit (CTU) or a largest coding unit (LCU). A CTU or an LCU may continue to be further partitioned to obtain one or more basic coding units, referred to as CUs. For example, a processing unit is an LCU. According to characteristics of each LCU, the LCU is correspondingly further partitioned into a plurality of CUs, and reference may be made to the schematic diagram shown in FIG. 1B. It is to be understood that FIG. 1B only exemplarily represents a division manner of an LCU, which is not limited. FIG. 1B represent that an LCU is uniformly partitioned into a plurality of CUs. However, in practice, an LCU may be nonuniformly partitioned into a plurality of CUs. Each CU is the most fundamental element in one encoding stage, and each CU may be independently encoded and decoded by using a predictive coding mode.

2) Predictive Coding: Current video coding technology includes various predictive coding modes such as an intra-prediction mode and an inter-prediction mode. For a current CU, an encoder side needs to select a predictive coding mode most appropriate for the CU from numerous possible predictive coding modes and informs a decoder side of the selected predictive coding mode. Next, the encoder side performs predictive coding on the current CU by using the predictive coding mode selected by the encoder side. A residual video signal is obtained after the current CU is predicted by using a selected reconstructed video signal.

(1) Intra-prediction mode: A predicted signal is from an encoded and reconstructed region in the same image.

(2) Inter-frame prediction mode: A predicted signal is from another encoded image (referred to as a reference image) different from a current image.

3) Transform and quantization: Transform operations such as Discrete Fourier Transform (DFT) and Discrete Cosine Transform (DCT) are performed on a residual video signal to convert the residual video signal into a transform domain, which is referred to as a conversion coefficient. A lossy quantization operation is further performed on a residual video signal in the transform domain, and certain information is discarded, so that a quantized signal is readily available for compression and expression. In some video coding standards, there may be more than one transform mode for selection. Therefore, the encoder side needs to select one transform mode for the current CU and informs the decoder side of the mode. The fineness of quantization is normally determined by a quantization parameter (QP). When the value of the QP is larger, it indicates that coefficients in a larger value range are quantized into one same output, usually causing a severer distortion and a lower bit rate. In comparison, when the value of the QP is smaller, it indicates that coefficients in a smaller value range are quantized into one same output, usually causing a less severe distortion and a corresponding higher bit rate.

4) Entropy coding or statistical coding: Statistical compression coding is performed on a quantized transform domain signal according to the frequency of each value, and finally a binary (0 or 1) compressed bit stream. In addition, other information is coded; for example, a selected mode and a motion vector also require entropy coding to reduce a bit rate. Statistical coding is a lossless coding mode, and may effectively reduce a bit rate required to express the same signal. A common statistical coding mode is Variable Length Coding (VLC) or Content Adaptive Binary Arithmetic Coding (CABAC).

5) Loop filtering: A reconstructed decoded image may be obtained by performing operations such as inverse quantization, inverse transform, and predictive compensation (inverse operations of step 2) to step 4) in the foregoing) on an encoded image. Compared with a raw image, in a reconstructed decoded image, some information may be different from that in the raw image due to the impact of quantization, causing a distortion. Therefore, filtering operations, for example, operations of filters such as deblocking, S ample Adaptive Offset (SAO) or an Adaptive Lattice Filter (ALF), are performed on the reconstructed decoded image by using a filter, so that the degree of the distortion caused by quantization may be effectively reduced. These filtered reconstructed decoded images are used as a reference for subsequent encoded images for predicting a future signal. Therefore, the foregoing filtering operations are also referred to as loop filtering, or referred to as a filtering operation in an encoding loop.

Figure 1C:
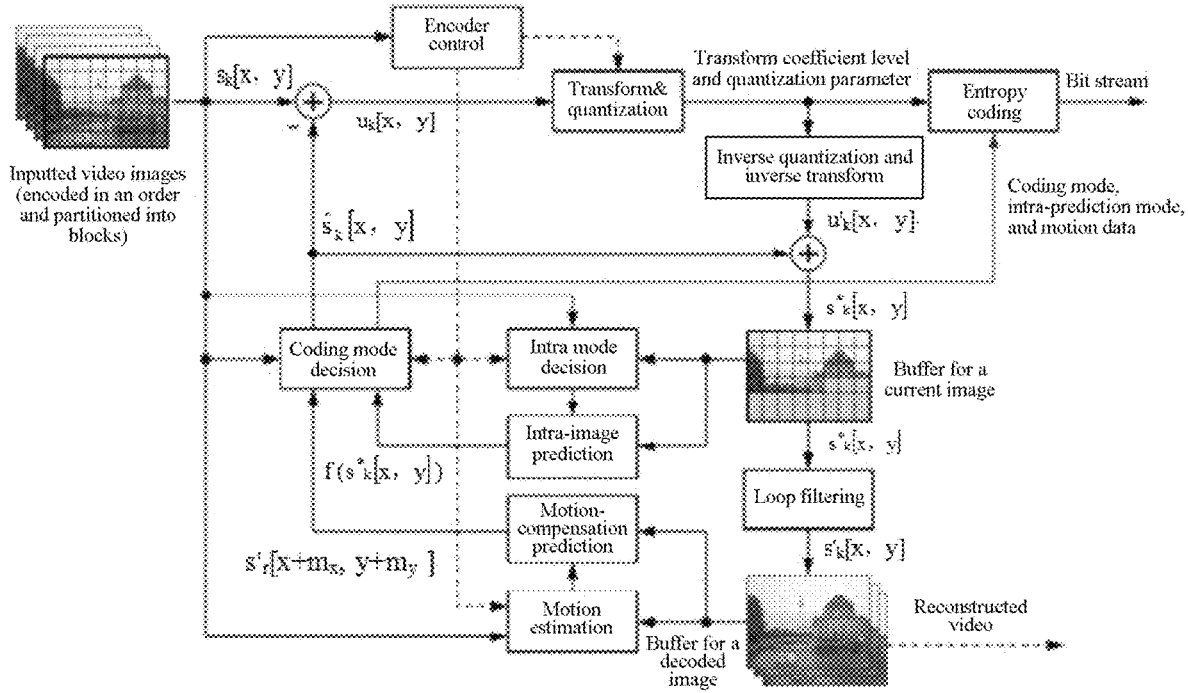
FIG. 1c is a basic work flowchart of a video encoder according to an embodiment of the disclosure.

Based on the related description of the foregoing step 1) to step 5), FIG. 1c is exemplarily a basic work flowchart of a video encoder. In FIG. 1c, a $k^{th}$ CU (labeled as $s_k[x, y]$) is used as an example for description. k is a positive integer greater than or equal to 1 and less than or equal to a quantity of CUs in a current image. $s_k[x, y]$ represents a pixel with coordinates of [x, y] in the $k^{th}$ CU, x represents a horizontal coordinate of the pixel, and y represents a vertical coordinate of the pixel. $s_k[x, y]$ is processed in an optimal mode in processing modes such as motion compensation and intra-prediction to obtain a predicted signal $\hat{s}_k[x, y]$, $\hat{s}_k[x, y]$ is subtracted from $s_k[x, y]$ to obtain a residual signal $u_k[x, y]$, and then the residual signal $u_k[x, y]$ is transformed and quantized. Data outputted from quantization are processed in two different ways. In one way, data are transmitted to an entropy encoder for entropy coding, an encoded bit stream is outputted to a buffer for storage and waits to be transferred. In another way, data are inversely quantized and inversely transformed to obtain a signal $u'_k[x, y]$. The signal $u'_k[x, y]$ and $\hat{s}_k[x, y]$ are added to obtain a new predicted signal $s*_k[x, y]$, and $s*_k[x, y]$ is transmitted to a buffer for the current image for storage. Intra-image prediction is performed on $s*_k[x, y]$ to obtain $f(s*_k[x, y])$. Loop filtering is performed on $s*_k[x, y]$ to obtain $s'_k[x, y]$, and $s'_k[x, y]$ is transmitted to a buffer for a decoded image for storage for generating a reconstructed image. Motion-compensation prediction is performed on $s'_k[x, y]$ to obtain $s'_r[x+m_x, y+m_y]$. $s'_r[x+m_x, y+m_y]$ represents a reference block. $m_x$ and $m_y$ respectively represent a horizontal component and a vertical component of a motion vector (MV).

It can be seen according to the foregoing description of the decoding process that on the decoder side, for each CU, after obtaining a compressed bit stream, a video decoder needs to first perform entropy decoding to obtain various mode information (for example, predictive coding mode information) and a quantized transform coefficient, so that a residual signal may be obtained by inversely quantizing and inversely transforming the coefficients. In another aspect, a predicted signal (that is, a predicted value of each pixel in the CU) corresponding to the CU may be obtained according to the known predictive coding mode information. A reconstructed signal (that is, a reconstructed image) may be obtained by adding the residual signal and the predicted signal. Finally, an operation of loop filtering is performed on the reconstructed signal to generate a final output signal (that is, an eventually decoded image obtained through decoding).

In a case that different video coding standards are used in practice, there are certain differences between predictive coding modes in the foregoing coding process. Predictive coding modes used in AVS3 may include an intra-prediction mode, an inter-prediction mode, an intra block copy prediction mode, an intra string copy mode, and the like. During encoding using AVS3, these predictive coding modes may be used separately or in combination. The predictive coding modes are respectively described below.

Figure 1D:
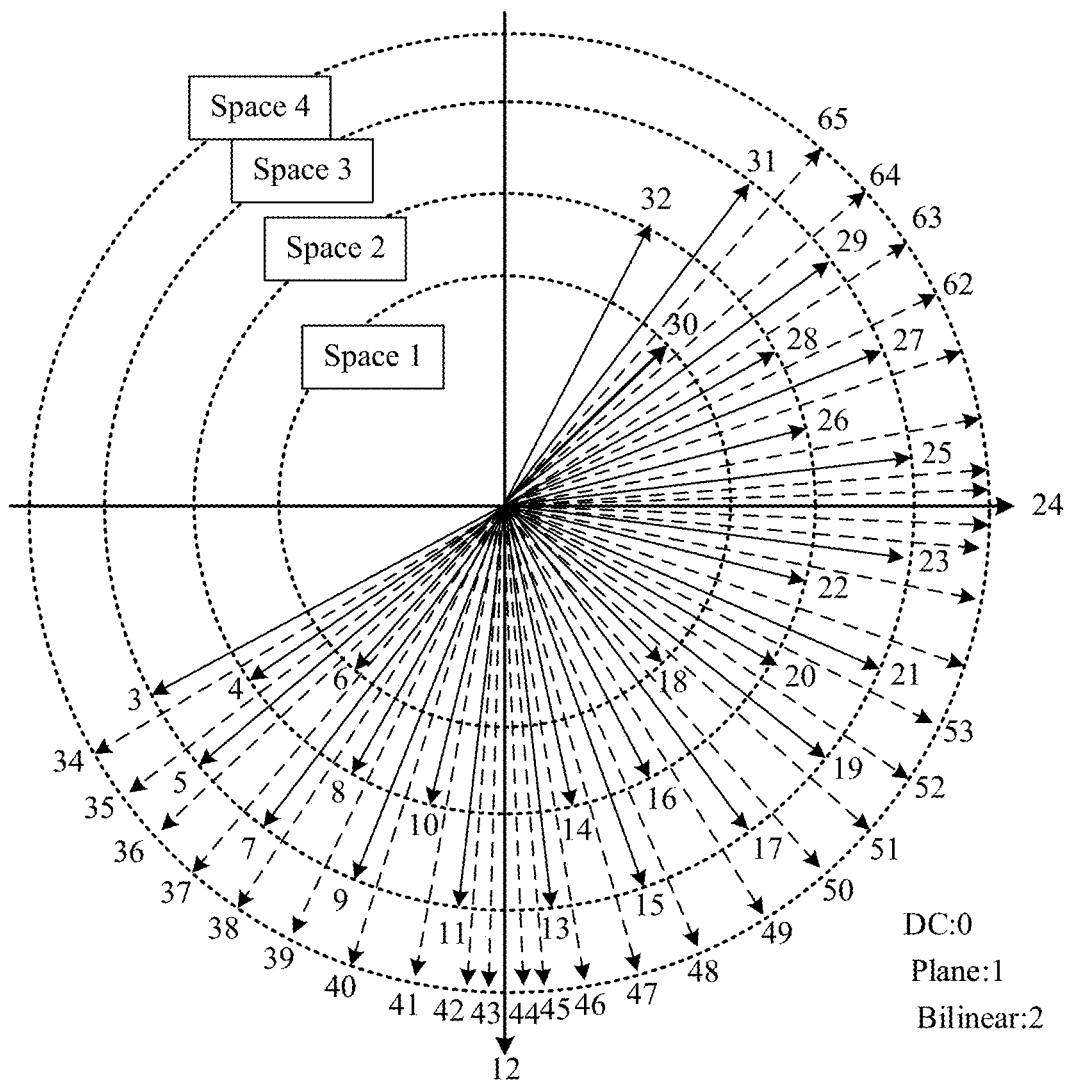
FIG. 1d is a schematic mode diagram of a plurality of intra-prediction modes according to an embodiment of the disclosure.
Figure 1E:
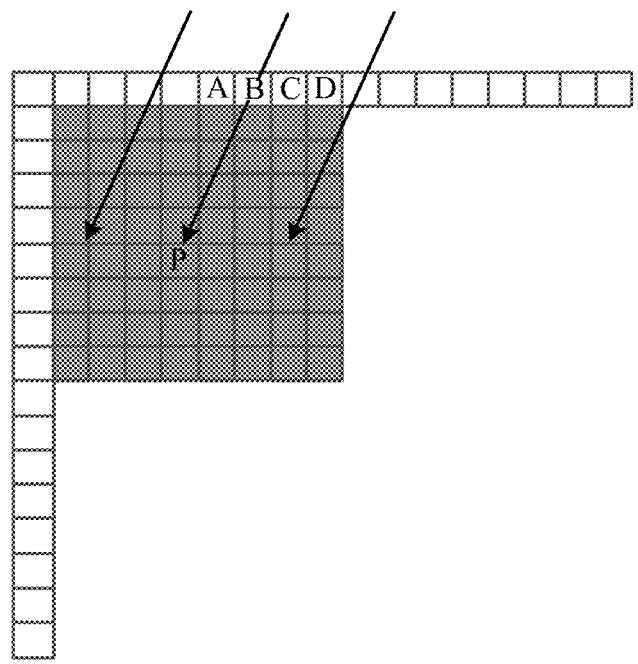
FIG. 1e is a schematic diagram of an angular prediction mode in an intra-prediction mode according to an embodiment of the disclosure.

(I) Intra-Prediction Mode:

The intra-prediction mode is a common predictive coding technology in which mainly a predicted value of a current CU is derived from an adjacent encoded area based on a correlation of a pixel in a video image in a spatial domain. As shown in FIG. 1d, at present AVS3 includes 3 non-angular intra-prediction modes (Plane, indicates, and Bilinear) and 66 angular prediction modes. When an angular prediction mode is used, for a pixel in a current CU, the value of a reference pixel at a corresponding position in a reference pixel row or column is used as a predicted value according to a direction corresponding to an angle of the prediction mode. As shown in FIG. 1e, for a pixel P in the current CU, a position of a reference pixel is determined from an encoded pixel row above according to a prediction angle in the figure, and then the value of the reference pixel is used as a predicted value of the pixel P. However, all positions of reference pixels pointed by all pixel positions do not have integer pixel precision (for example, the position of the reference pixel of the pixel P in FIG. 1e is a position of a subpixel between a pixel B and a pixel C). In this case, the predicted value of the pixel P needs to be obtained through interpolation using nearby pixels. To improve the efficiency of intra-prediction, the value of a reference pixel of intra-prediction stored in an on-chip memory may be used.

Figure 1F:
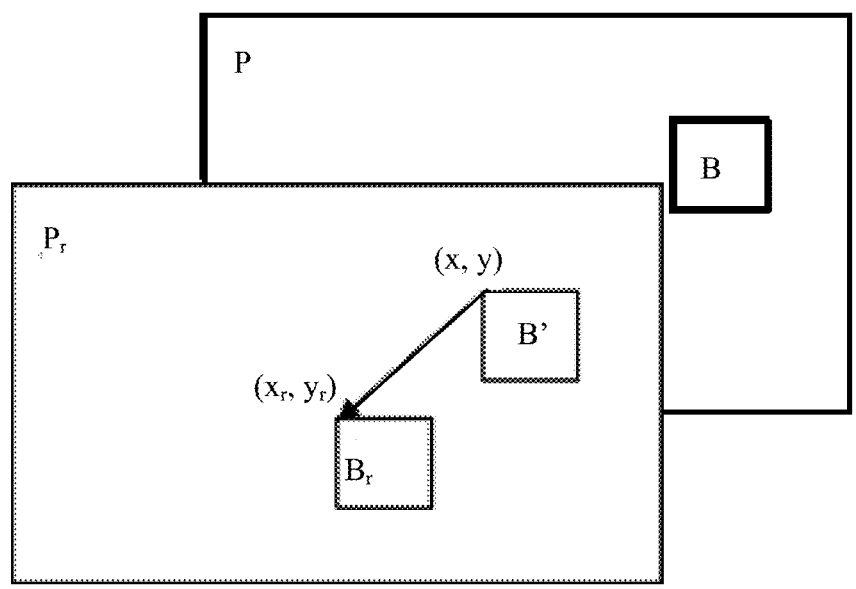
FIG. 1f is a schematic diagram of inter prediction according to an embodiment of the disclosure.

(II) Inter-Frame Prediction Mode:

Referring to FIG. 1f, a correlation in a video time domain is mainly used in inter-prediction, and a pixel in another adjacent encoded image is used to predict a pixel in a current image, thereby effectively eliminating redundancy in a video time domain, so that bits for encoding residual data may be effectively saved. P is the current frame, $P_r$ is the reference frame, B is the current CU, and $B_r$ is a reference block (that is, a reference CU) of B. B' and B have the same coordinate position in images. It is assumed that the coordinates of $B_r$ are $(x_r, y_r)$ and the coordinates of B' are (x, y). When a displacement between the current CU. A displacement between the current CU and a reference block thereof is referred to as a motion vector (MV). $MV=(x_r-x, y_r-y)$.

Figure 1G:
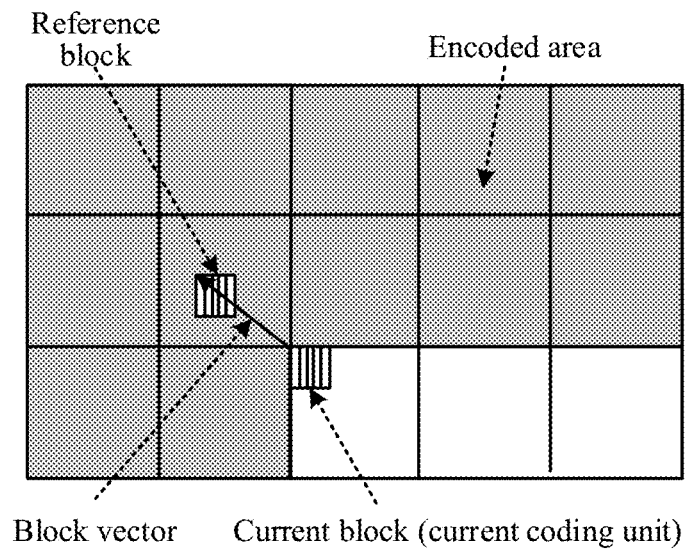
FIG. 1g is a schematic diagram of intra block copy according to an embodiment of the disclosure.

(III) Intra Block Copy Mode:

Intra block copy (IBC) mode: IBC may also be referred to as block copy intra-prediction, is an intra-coding tool used in HEVC Screen Content Coding (SCC) expansion, and significantly improves the coding efficiency of screen content. In AVS3 and VVC, the IBC technology is also used to improve the coding efficiency of screen content. In IBC, a correlation of a screen content video in space is mainly used. A pixel in an encoded area in a current image is used to predict a predicted value of a pixel in a current CU, so that bits required for encoding pixels may be effectively saved. As shown in FIG. 1g, in IBC, a displacement between a current CU and a reference block thereof may be referred to as a block vector (BV). H.266/VVC uses a BV prediction technology similar to intra-prediction, thereby further saving bits required for encoding BV.

Figure 1H:
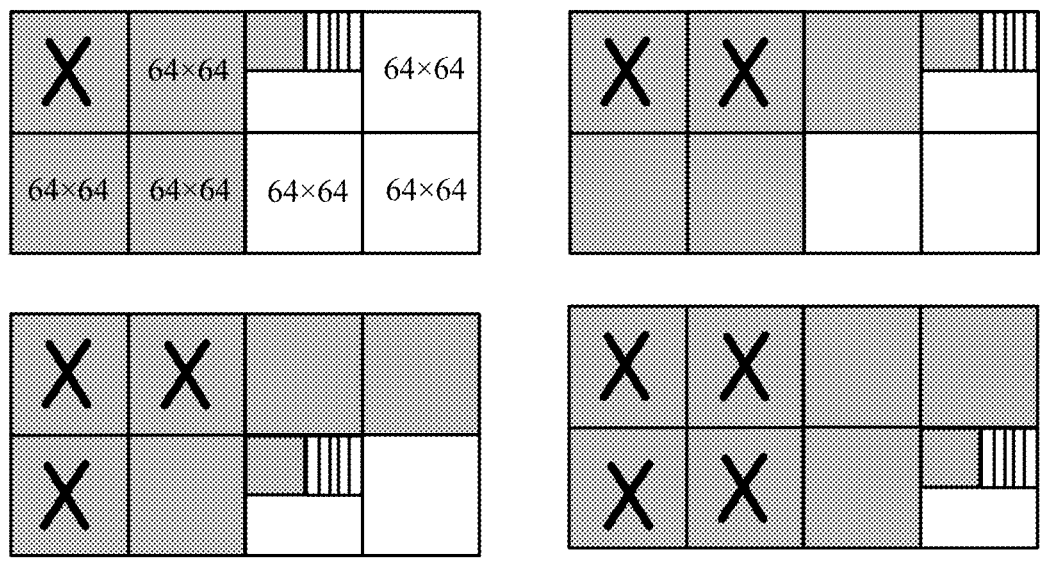
FIG. 1h is a schematic diagram of a range of reference pixels of intra block copy according to an embodiment of the disclosure.

In hardware implementation, all reference pixels used for IBC prediction may be stored in an on-chip memory, thereby reducing additional bandwidths for memory read/write inside and outside a chip. To reduce hardware costs, it is restricted that IBC may only use memory with a size of S×S pixels (for example, a size of 128×128 pixels) as a storage space. In this case, to improve the utilization efficiency of the memory, the memory with a size of 128×128 may be partitioned into four areas with a size of 64×64, thereby implementing the use of reference pixel memory. A range of reference pixels may be shown in FIG. 1h. In FIG. 1h, a block with a vertical bar is a current CU in a current processing unit (that is, a current CTU or a current LCU). A gray area is an encoded portion, and a white area is an unencoded portion in the current processing unit. A portion with a label "X" in FIG. 1h is not usable by the current CU, and a pixel in an area with a label "X" in FIG. 1h cannot be used as a reference pixel of the current CU.

In the embodiments of the disclosure, the memory with a size of 128×128 pixels is only used as an example for description. In other embodiments, memory with a size of 64×64 pixels may be used to further reduce hardware costs, or memory with a size of 256×256 pixels may be used to meet memory requirements of more data. The size of the memory space is not limited in any manner in the disclosure. In addition, in the embodiments of the disclosure, an example in which the memory space is partitioned into four areas with a size of 64×64 is only used for description. In other embodiments, another area partitioning manner may be used. For example, memory with a size of 128×128 is partitioned into 16 areas with a size of 32×32 for reuse of reference pixel memory, and the like. That is, the memory with a size of S×S pixels may be partitioned into $G^2$ areas with a size of $$\frac{S}{G} \times \frac{S}{G}$$

for reuse of reference pixel memory. G is a divisor of S. That is, a quotient of dividing S by G is an integer.

(IV) Intra String Copy Mode—String Prediction Submode:

Intra string copy (ISC) technology may also be referred to as string copy intra-prediction, in which one CU is mainly partitioned into a series of pixel strings or unmatched pixels (that is, pixels that are not matched to reference pixels) according to a scan mode (for example, a raster scan, a back-and-forth scan, or a Zig-Zag scan). Similar to the IBC mode, for each pixel string in the string prediction submode, a search is made in an encoded area of a current image for a reference string with the same shape, to derive a predicted value of each pixel in the current string. Instead of directly encoding a pixel value, a residual between a pixel value and the predicted value of each pixel in the current string is encoded, so that bits may be effectively saved.

Figure 1I:
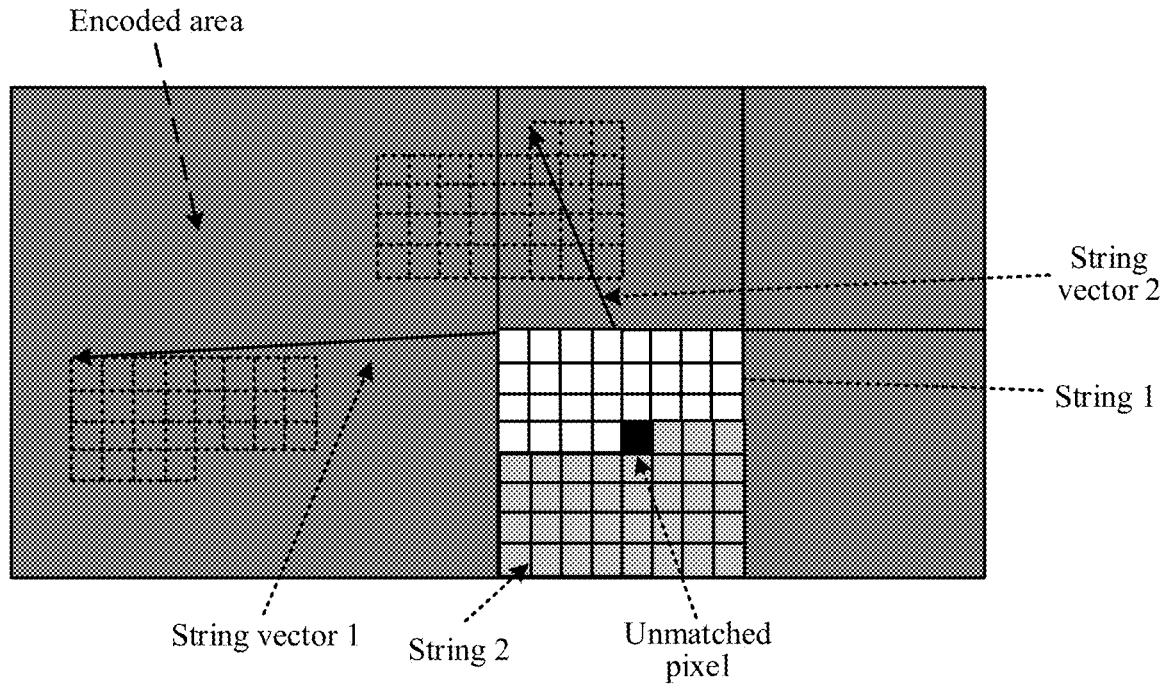
FIG. 1i is a schematic diagram of intra string copy according to an embodiment of the disclosure.

In an implementation, none of pixel strings obtained by partitioning a CU includes an unmatched pixel. In this implementation, FIG. 1i is exemplarily a schematic diagram of intra string copy. A dark gray area is an encoded area. 28 white pixels form a string 1, 35 light gray pixels form a string 2, and one black pixel is an unmatched pixel.

Figure 1J:
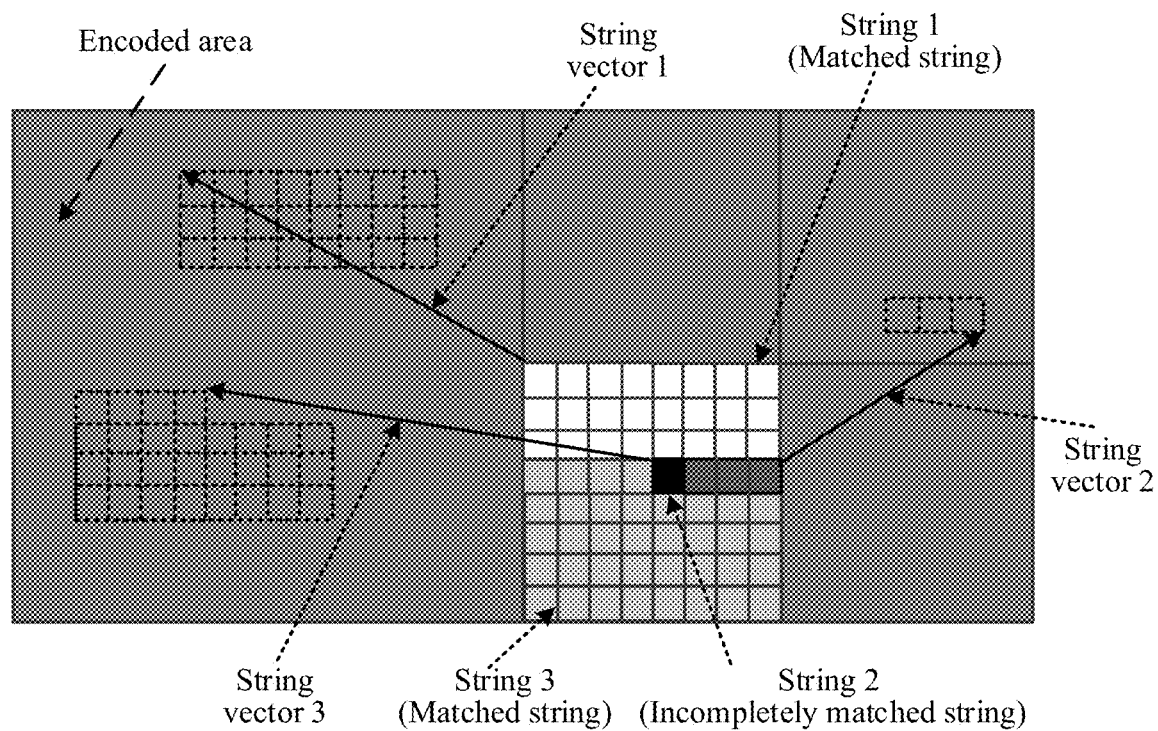
FIG. 1j is a schematic diagram of intra string copy with string length resolution control according to an embodiment of the disclosure.

In an implementation, because a string length resolution control technology has been adopted in the AVS meeting in August, 2020, it is limited that the length of every string is an integer multiple of 4, and types of strings include a matched string and an incompletely matched string. The matched string is a string that has a length being an integer multiple of 4 and does not include an unmatched pixel. The incompletely matched string is a string that has a length of 4 second includes an unmatched pixel. In other embodiments, the length of a matched string may not be limited to an integer multiple of 4, or may be an integer multiple of 5, an integer multiple of 3, or the like. Similarly, the length of an incompletely matched string may not be limited to an integer multiple of 4, and may be 5, 6, or the like. For a matched pixel in an incompletely matched string, a predicted value may be derived according to a corresponding string displacement vector. For an unmatched pixel in an incompletely matched string, a pixel value of the unmatched pixel may be obtained through decoding from a bit stream. That is, a pixel string obtained by partitioning a CU may include an unmatched pixel. In this implementation, FIG. 1j is exemplarily a schematic diagram of intra string copy with string length resolution control. A dark gray area is an encoded area. 24 white pixels form a string 1, one black pixel and three pixels on the right side of the black pixel form a string 2, and 36 light gray pixels form a string 3.

In addition, the intra string copy technology further requires encoding of a string displacement vector (string vector, SV), a string length, and a flag indicating whether there is a matched string corresponding to each string in a current CU. The string displacement vector may also be referred to as a string vector, and is used for representing a displacement from a current string to a reference string. The string length represents a quantity of pixels included in the current string.

In example embodiments, the string length may be encoded in various manners. Several examples are provided below (some examples may be used in combination): (1) The string length is directly encoded. (2) A quantity of pixels, which are to be processed following a current string, is encoded, so that a decoder side performs decoding according to a size P of a current CU and a quantity P1 of processed pixels to obtain a quantity P2 of the to-be-processed pixels following the current string, thereby calculating a string length L of the current string. L=P−P1−P2. L and P are both integers greater than 0, and P1 and P2 are both integers greater than or equal to 0. (3) One flag is encoded to indicate whether a current string is the last string. If the current string is the last string, a string length L of the current string is calculated according to a size P of a current CU and a quantity P1 of processed pixels. L=P−P1.

During actual application, to maintain relatively low complexity of hardware implementation, a reference range limitation similar to that in IBC is used in the intra string copy technology in AVS3. Memory with a size of 128×128 pixels is used, the value of a reference pixel and the value of a current pixel to be reconstructed are stored, and a memory reuse strategy similar to that in IBC is used to improve the utilization efficiency of the memory.

(V) Intra String Copy Mode—an Equal Value String and Unit Vector String Submode:

An equal value string and unit vector string submode is a submode of an intra string copy mode, and has been adopted in the AVS3 standards in October, 2020. Similar to the intra string copy mode, in the mode, one CU (that is, an encoded/decoded block) is partitioned in a scan order into a series of pixel strings or unmatched pixels. The type of a pixel string may be an equal value string or a unit vector string. The characteristic of an equal value string in this mode lies in that all pixels in the pixel string have the same predicted value. The characteristic of a unit vector string (also referred to as a unit base vector string, a unit offset string, a copy above string, or the like) in this mode lies in that for each pixel in a pixel string, a reconstructed value of a pixel above is used as a predicted value of the current pixel. In the equal value string and unit vector string submode, a length and a predicted value of each string in a current CU need to be encoded; and a reference range of the equal value string and unit vector string submode is consistent with a reference range of the string prediction submode.

Based on the related description of the foregoing predictive coding modes, the embodiments of the disclosure provide an encoding and decoding solution. In one aspect, it is allowed in the encoding and decoding solution to use a unit vector string for a CU in a string prediction submode in intra string copy, thereby improving the encoding performance of string prediction. In another aspect, it may be allowed in the encoding and decoding solution to derive a pixel adjacent to a current CU as a reference for a current string, thereby obtaining a predicted value of a pixel in the current string. Specifically, the encoding and decoding solution may include a video encoding method and a video decoding method. The video encoding method and the video decoding method provided in the embodiments of the disclosure are described below with reference to FIG. 2 and FIG. 4 respectively.

Figure 2:
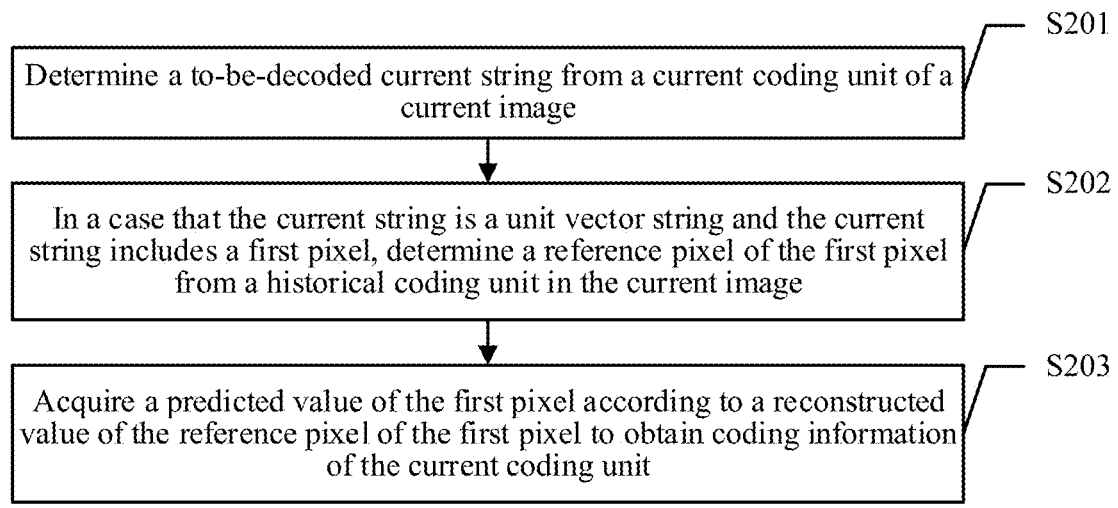
FIG. 2 is a schematic flowchart of a video encoding method according to an embodiment of the disclosure.

FIG. 2 is a flowchart of a video encoding method according to an embodiment of the disclosure. The video encoding method may be performed by the video encoding device described above or the video encoder in the video encoding device. For ease of description, an example in which the video encoding device performs the video encoding method is used for description below. As shown in FIG. 2, the video encoding method may include the following steps S201 to S203:

S201: Determine a to-be-decoded current string from a current coding unit of a current image.

In an example embodiment, the video encoding device may receive a raw video signal, and sequentially encode an image in the raw video signal. Correspondingly, the current image is an image being encoded currently, and may be any frame of image in the raw video signal. In a process of encoding the current image, the video encoding device may first partition the current image into a plurality of processing units (for example, CTUs or LTUs), and further partition each processing unit into one or more coding units (that is, CUs), thereby sequentially encoding each coding unit.

A coding unit to be encoded currently (that is, about to be encoded currently) or being encoded currently (that is, some encoded pixels) may be referred to as a current coding unit. For example, it is set that a total of five CUs are provided, namely, CU1, CU2, CU3, CU4, and CU5. In addition, pixels in CU1 and CU2 have all been encoded, and none of pixels in CU3 to CU5 has been encoded. In this case, it may be determined according to an encoding sequence that CU3 is a coding unit to be encoded currently. Therefore, a current coding unit is CU3. In another example, it is set that a total of five CUs are provided, namely, CU1, CU2, CU3, CU4, and CU5. In addition, pixels in CU1 have all been encoded, some pixels in CU2 have been encoded (that is, some remaining pixels have not been encoded), and none of pixels in CU3 to CU5 has been encoded. In this case, it may be determined that CU2 is a coding unit being encoded currently. Therefore, a current coding unit is CU2.

For a current coding unit, the video encoding device may encode each pixel in the current coding unit by using ISC. The current coding unit may be encoded in a string prediction submode in an intra string copy (ISC) mode. In addition, it is allowed to use a unit vector string for the coding unit in the string prediction submode. Alternatively, the current coding unit may be encoded in an equal value string and unit vector string submode in an intra string copy (ISC) mode. This is not limited in the disclosure.

For ease of description, an example in which a current coding unit is encoded in a string prediction submode is used for description below. In addition, the current coding unit may include P rows and Q columns of pixels, values of P and Q being both positive integers. The values of P and Q may be equal or not equal. This is not limited in the disclosure. For example, the values of P and Q may both be 64. In this case, the current coding unit may include 64×64 pixels.

Figure 3A:
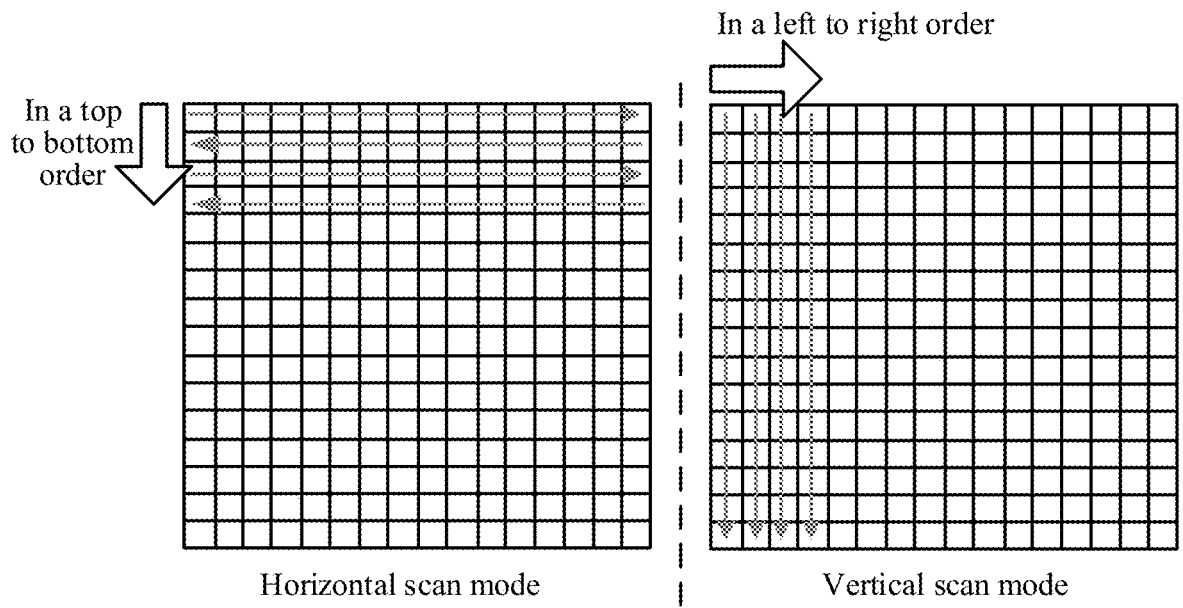
FIG. 3a is a schematic diagram of a scan mode according to an embodiment of the disclosure.

In an embodiment, the video encoding device may determine a scan mode of the current coding unit. The scan mode includes, but not limited to, a horizontal scan mode and a vertical scan mode. Referring to FIG. 3a, the horizontal scan mode (which may also be referred to as a horizontal back-and-forth scan mode) is a scan mode of sequentially scanning rows of pixels in a current coding unit in a top to bottom order. The vertical scan mode (or referred to as a vertical scan mode) is a scan mode of sequentially scanning columns of pixels in a current coding unit in a left to right order. In other embodiments, the horizontal scan mode may be a scan mode of sequentially scanning rows of pixels in a current coding unit in a bottom to top order. The vertical scan mode may be a scan mode of sequentially scanning columns of pixels in a current coding unit in a right to left order. This is not limited in the disclosure.

For ease of description, an example in which the horizontal scan mode and the vertical scan mode shown in FIG.

3a are used to perform scanning is used for description below. Next, the video encoding device may partition a current coding unit into at least one string and/or unmatched pixel according to a scan mode of the current coding unit, and sequentially encode the string and/or unmatched pixel obtained through partitioning. A current string to be encoded may be referred to as a current string. Because it is limited in AVS3 standards that the length of a string needs to be an integer multiple of 4, the current string may include 4L pixels, L being a positive integer. However, it is to be understood that in other video coding standards that if the length of a string is not specified, the current string may include one or more pixels. In addition, the current string may be a unit vector string or may not be a unit vector string; and when the current string is a unit vector string, the current string may be a matched string or an incompletely matched string. This is not limited in the disclosure. If the current string is a unit vector string, step S202 may be performed.

The characteristics of the unit vector string described in the embodiments of the disclosure are not identical with the characteristics of the unit vector string in the foregoing equal value string and unit vector string submode. The characteristics of the unit vector string described in the embodiments of the disclosure are as follows: A predicted value of each pixel in the unit vector string is determined by a reconstructed value of a corresponding reference pixel, and a reference pixel corresponding to a given pixel is a pixel that is located on a target side of the pixel and is adjacent to the pixel. The target side described may be determined according to a scan mode of the current coding unit. In a case that the scan mode of the current coding unit is a horizontal scan mode and the horizontal scan mode instructs to scan the current coding unit in a top to bottom order, the target side of the given pixel refers to a position above of the given pixel. That is, the reference pixel of the given pixel is a pixel (for example, a pixel right above) in a row above the given pixel. In a case that a scan mode of the current coding unit is a vertical scan mode and the vertical scan mode instructs to scan the current coding unit in a left to right order, the target side of the given pixel refers to a position on a left of the given pixel. For example, the reference pixel of the given pixel is a pixel (for example, a pixel right on the left) in a column on the left of the given pixel.

Figure 3B:
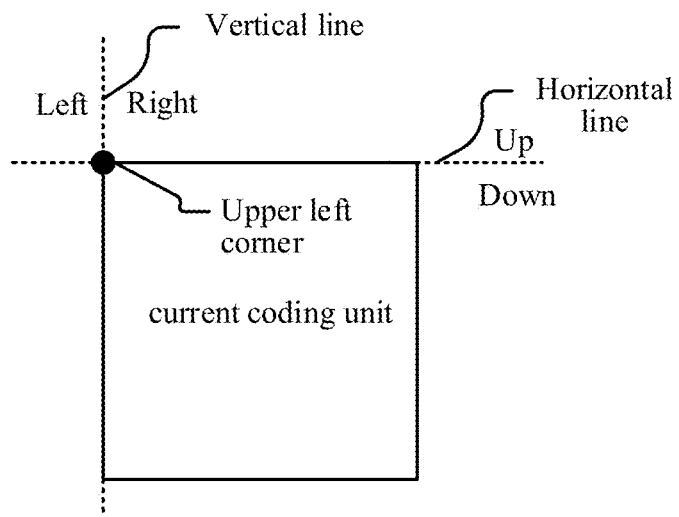
FIG. 3b is a diagram of position description of a current coding unit according to an embodiment of the disclosure.

The term "above" described in the embodiments of the disclosure is a position on an upper side of a horizontal line located at an upper left corner of the current coding unit, and the term "right above" is a position vertically above the position of the pixel. The term "left" is a position on the left side of a vertical line at an upper left corner of the current coding unit. The term "right on the left" is a position horizontally on the left of the position of the pixel, as shown FIG. 3b. The reconstructed value in the embodiments of the disclosure, is a pixel value without loop filtering.

S202: In a case that the current string is a unit vector string and the current string includes a first pixel, determine a reference pixel of the first pixel in a historical coding unit in the current image.

The historical coding unit is an encoded coding unit adjacent to the current coding unit in the current image. The reference pixel corresponding to the first pixel is adjacent to the first pixel in the current image, and the first pixel meets the following condition: the reference pixel corresponding to the first pixel is not located in the current coding unit. The historical coding unit being adjacent to the current coding unit refers to that there is no other coding unit between the historical coding unit and the current coding unit. The reference pixel corresponding to the first pixel being adjacent to the first pixel in the current image refers to that in the current image, a row in which the reference pixel of the first pixel is located and a row in which the first pixel is located are adjoining to each other (that is, abutting). For example, in the current image, it is assumed that the row in which the reference pixel of the first pixel is located is the fifth row. If the row in which the first pixel is located is the sixth row, it may be considered that the row in which the reference pixel of the first pixel is located and the row in which the first pixel is located are adjoining to each other. If the row in which the first pixel is located is the seventh row, it may be considered that the row in which the reference pixel of the first pixel is located and the row in which the first pixel is located are not adjoining to each other. Alternatively, the reference pixel corresponding to the first pixel being adjacent to the first pixel in the current image refers to that in the current image, a column in which the reference pixel corresponding to the first pixel is located and a column in which the first pixel is located are adjoining to each other (that is, abutting). For example, in the current image, it is assumed that the column in which the reference pixel of the first pixel is located is the fifth column. If the column in which the first pixel is located is the sixth column, it may be considered that the column in which the reference pixel of the first pixel is located and the column in which the first pixel is located are adjoining to each other. If the column in which the first pixel is located is the seventh column, it may be considered that the column in which the reference pixel of the first pixel is located and the column in which the first pixel is located are not adjoining to each other.

It can be seen that when the first pixel and the reference pixel of the first pixel are adjacent in the current image, the first pixel may be a pixel in a critical row or a critical column in the current coding unit. The critical row may also be referred to as an edge row, and may be the first row or the last row of the current coding unit. Similarly, the critical column may also be referred to as an edge column, and may be the first column or the last column of the current coding unit.

In an example embodiment, the specific meaning of the first pixel may be determined according to the scan mode of the current coding unit. For example, in a case that the scan mode of the current coding unit is the horizontal scan mode and the horizontal scan mode instructs to scan the current coding unit in the top to bottom order, the historical coding unit is located above the current coding unit (that is, the historical coding unit is an encoded CU that is located above the current coding unit and is adjacent to the current coding unit), and the first pixel is a pixel in the first row of the current coding unit. That is, in this case, the current string includes at least one pixel in the first row in the current coding unit. In a case that the scan mode of the current coding unit is the vertical scan mode and the vertical scan mode instructs to scan the current coding unit in the left to right order, the historical coding unit is located on the left of the current coding unit (that is, the historical coding unit is an encoded CU that is located on the left of the current coding unit and is adjacent to the current coding unit), and the first pixel is a pixel in the first column of the current coding unit. That is, in this case, the current string includes at least one pixel in the first column in the current coding unit.

S203: Acquire a predicted value of the first pixel according to a reconstructed value of the reference pixel of the first pixel to obtain coding information of the current coding unit.

In an example embodiment, the reconstructed value of the reference pixel of the first pixel may be acquired first, and the reconstructed value of the reference pixel of the first pixel is used as the predicted value of the first pixel. Next, a residual between the pixel value and the predicted value of the first pixel may be encoded to obtain the coding information of the current coding unit. In this coding manner, a quantity of bits may be reduced, thereby improving the efficiency of coding. Alternatively, after the predicted value of the first pixel is obtained, indication information (for example, a string vector, and a string length) used for indicating the predicted value may be encoded to obtain the coding information of the current coding unit. When different scan modes are used for the current coding unit, the reconstructed value of the reference pixel of the first pixel are acquired in different manners. For details, reference is made to the following description:

1) In a case that the scan mode of the current coding unit is the horizontal scan mode and the horizontal scan mode instructs to scan the current coding unit in the top to bottom order, the manner of acquiring the reconstructed value of the reference pixel of the first pixel includes any one of the following:

First manner: the reconstructed value of the reference pixel of the first pixel is acquired from a first storage space (or referred to as a reference pixel memory of the intra string copy mode) corresponding to an intra string copy mode. The first storage space of the intra string copy mode may be a memory with a size of 128×128 described in the foregoing IBC content, and the first storage space may be partitioned into four areas with a size of 64×64 for the reuse of a reference pixel memory. However, as described in the related content of the foregoing IBC, the first storage space may not be limited to the memory with a size of 128×128, and the first storage space is also not limited to being partitioned into four areas with a size of 64×64. The predictive coding mode of the current coding unit is a string prediction submode in the intra string copy mode or an equal value string and unit vector string submode. Therefore, the value of the first pixel is stored in the first storage space. In this case, the reconstructed value of the reference pixel of the first pixel is acquired from the first storage space and used as the predicted value of the first pixel, so that the predicted value is assigned in one storage space, thereby effectively improving the efficiency of coding.

Second manner: the reconstructed value of the reference pixel of the first pixel is acquired from a second storage space (or referred to as a reference pixel memory of the intra-prediction mode) corresponding to an intra-prediction mode. In a case that the reference pixel of the first pixel is encoded in the intra-prediction mode, the reconstructed value of the reference pixel of the first pixel is located in the second storage space. In a case that the reference pixel of the first pixel is encoded in the intra string copy mode, the reconstructed value of the reference pixel of the first pixel may be overwritten due to memory reuse. Therefore, to improve a success rate of acquiring the reconstructed value of the reference pixel of the first pixel, the reconstructed value of the reference pixel of the first pixel may be directly acquired from the second storage space.

Third manner: the current image is partitioned into a plurality of N×N areas, and in a case that the first pixel is located in the first row of any N×N area, the reconstructed value of the reference pixel of the first pixel is acquired from the second storage space, or otherwise, the reconstructed value of the reference pixel of the first pixel is acquired from the first storage space. Specifically, the value of N may be determined according to an empirical value or the size of a processing unit or the size of a current CU. For example, the size of a processing unit is 128×128. The target area may be partitioned into a plurality of areas with a size of 128×128. When the first pixel is located in the first row of any area with a size of 128×128, as can be seen from the reference range limitation shown in FIG. 1h (the scan mode corresponding to FIG. 1h is the horizontal scan mode), because the first storage space only stores a reconstructed value of a CU on the left of the current CU in addition to the value (for example, the reconstructed value of a reconstructed pixel) of the current CU but does not store the reconstructed value of the reference pixel (that is, a pixel that is located above the current CU and is adjacent to the first pixel) of the first pixel, the reconstructed value of the reference pixel of the first pixel may be acquired from the second storage space, thereby improving the success rate of acquiring the reconstructed value. When the first pixel is not located in the first row of any area with a size of 128×128, the reference pixel of the first pixel is located inside the current CU. In this case, the reconstructed value of the reference pixel exists in the first storage space, and correspondingly the reconstructed value of the reference pixel of the first pixel is acquired from the first storage space, thereby improving the efficiency of acquiring the reconstructed value.

Pixels in the current string may all be second pixels (that is, the current string does not include the first pixel) or the current string may include the first pixel and the second pixel (that is, the current string includes the second pixel in addition to the first pixel). The second pixel is a pixel that is not in the first row of the current coding unit, and the second pixels in the current string are distributed in at least one row in the current coding unit. In this case, the computer device may derive the predicted value of each second pixel in the current string in any following manner:

Manner A: a predicted value of the second pixel in each row of the current string is acquired, row by row, with a row as a unit. For example, it is set that the second pixels in the current string are distributed in the second row and the third row of the current coding unit. In the top to bottom order, the predicted values of the second pixels in the second row may be first derived once, and then the predicted values of the second pixels in the third row are derived once. For each second pixel in each row, a reconstructed value of a reference pixel in an above row is used as a predicted value. In the manner A, predicted values of second pixels are acquired, row by row, so that the efficiency of acquiring the predicted values may be effectively improved, thereby improving the efficiency of coding.

Manner B: a predicted value of each second pixel in the current string is acquired, pixel by pixel, with a single pixel as a unit. For example, it is set that the second pixels in the current string are distributed in the second row and the third row of the current coding unit. The predicted values of the second pixels in the second row may be first derived, pixel by pixel, and then the predicted values of the second pixels in the third row are derived, pixel by pixel. For each second pixel, a reconstructed value of a reference pixel above the second pixel is used as a predicted value.

As can be seen, in the foregoing manners A and B, a predicted value of any second pixel is acquired according to a reconstructed value of a reference pixel that is located above the second pixel and is adjacent to the second pixel. Specifically, a reconstructed value of a reference pixel that is located above any second pixel and is adjacent to the second pixel may be directly used as a predicted value of the second pixel.

2) In a case that the scan mode of the current coding unit is the vertical scan mode and the vertical scan instructs to scan the current coding unit in the left to right order, the manner of acquiring the reconstructed value of the reference pixel of the first pixel includes any one of the following:

First manner: the reconstructed value of the reference pixel of the first pixel is acquired from a first storage space (or referred to as a reference pixel memory of the intra string copy mode) corresponding to an intra string copy mode.

Second manner: the reconstructed value of the reference pixel of the first pixel is acquired from a second storage space (or referred to as a reference pixel memory of the intra-prediction mode) corresponding to an intra-prediction mode.

Third manner: the current image is partitioned into a plurality of N×N areas, and in a case that the first pixel is located in the first column of any N×N area, the reconstructed value of the reference pixel of the first pixel is acquired from the second storage space, or otherwise, the reconstructed value of the reference pixel of the first pixel is acquired from the first storage space.

Pixels in the current string may all be third pixels (that is, the current string does not include the first pixel) or the current string may include the first pixel and the third pixel (that is, the current string includes the third pixel in addition to the first pixel). The third pixel is a pixel that is not in the first column of the current coding unit, and the third pixels in the current string are distributed in at least one column in the current coding unit. In this case, the computer device may derive the predicted value of each third pixel in the current string in any following manner:

Manner a: a predicted value of the third pixel in each column of the current string is acquired, column by column, with a column as a unit. For example, it is set that the third pixels in the current string are distributed in the second column and the third column of the current coding unit. In the left to right order, the predicted values of the third pixels in the second column may be first derived once, and then the predicted values of the third pixels in the third column are derived once. For each third pixel in each column, a reconstructed value of a reference pixel in a column on the left is used as a predicted value. In the manner a, predicted values of third pixels are acquired, column by column, so that the efficiency of acquiring the predicted values may be effectively improved, thereby improving the efficiency of coding.

Manner b: a predicted value of each third pixel in the current string is acquired, pixel by pixel, with a single pixel as a unit. For example, it is set that the third pixels in the current string are distributed in the second column and the third column of the current coding unit. In the left to right order, the predicted values of the third pixels in the second column may be first derived, pixel by pixel, and then the predicted values of the third pixels in the third column are derived, pixel by pixel. For each third pixel, a reconstructed value of a reference pixel on the left of the third pixel is used as a predicted value.

As can be seen, in the foregoing manners a and b, a predicted value of any third pixel is acquired according to a reconstructed value of a reference pixel that is located on the left of the third pixel and is adjacent to the third pixel. Specifically, a reconstructed value of a reference pixel that is located on the left of any third pixel and is adjacent to the third pixel may be directly used as a predicted value of the third pixel.

In an example embodiment, the video encoding device may encode a string indication flag to make the coding information include the string indication flag. In a case that the current string is a unit vector string, the string indication flag is a target value. The target value may be set according to an empirical value or a service requirement. For example, the target value may be set to 0, 1, or the like. In an embodiment, the string indication flag may be a binary flag to indicate whether the current string is a unit vector string. For example, when the string indication flag is 1 (that is, the target value is 0), the string indication flag may indicate that the current string is a unit vector string. When the string indication flag is 0, the string indication flag may indicate that the current string is not a unit vector string.

In an example embodiment, the video encoding device may encode a value K to make the coding information include the value K. The value K is greater than or equal to 0. The value K is used for indicating that at least one string following a $k^{th}$ group of pixels in a target group of pixels in the current coding unit is the unit vector string. The current coding unit may be partitioned into a plurality of groups of pixels. One group of pixels include one string or at least one unmatched pixel.

Specifically, in a case that the video encoding device performs string partitioning on the current coding unit by using the intra string copy technology shown in FIG. 1i, unmatched pixels may be partitioned from the current coding unit. In this case, these unmatched pixels obtained through partitioning may form one or more groups of pixels. Specifically, in a case that at least two unmatched pixels in the unmatched pixels obtained through partitioning have consecutive distribution positions in the current coding unit, all unmatched pixels in the at least two unmatched pixels may be used as one group of pixels, or some consecutive unmatched pixels are selected from the at least two unmatched pixels as one group of pixels, and unmatched pixels that are not selected are used as another group of pixels. In a case that an independent unmatched pixel (that is, an unmatched pixel between two strings) exists in the unmatched pixels obtained through partitioning, one independent unmatched pixel may be used as another group of pixels.

Only several grouping manners of grouping unmatched pixels into one or more groups of pixels are exemplarily listed in the embodiments of the disclosure, but are not exhaustively listed. During actual application, the encoder side may set a grouping manner as required. In a case that the video encoding device performs string partitioning on the current coding unit by using the intra string copy technology with string length resolution control shown in FIG. 1j, the current coding unit is partitioned into a plurality of strings (for example, a matched string and/or an incompletely matched string). In this case, each matched string may be used as one group of pixels, and each incompletely matched string may be used as one group of pixels.

In an implementation, one K may be included in the coding information of the current coding unit, and the target group of pixels may be all groups of pixels in the current coding unit. In this case, the value K may be used for indicating that all strings following a $k^{th}$ group of pixels in all groups of pixels in the current coding unit are unit vector strings. In an embodiment, in a case that each group of pixels includes one string, the value K may be used for indicating that a $(K+1)^{th}$ string in all groups of pixels in the current coding unit is a unit vector string.

In an implementation, each group of pixels includes one string. A plurality of Ks may be included in the coding information of the current coding unit, and one K corresponds to one target group of pixels. In this implementation, an $i^{th}$ K may be used for indicating that a $(K+1)^{th}$ string in a target group of pixels corresponding to the $i^{th}$ K in the current coding unit is a unit vector string. The target group of pixels corresponding to the $i^{th}$ K is a remaining group of pixels whose string type (a unit vector string or a non-unit vector string) has not been determined according to first i−1 Ks in the current coding unit. For example, it is set that the value of the first K is equal to 2. A target group of pixels corresponding to the first K is all groups of pixels in the current coding unit, and the first K indicates that a string in the first group of pixels and a string in the second group of pixels in the current coding unit are not unit vector strings and a string in the third group of pixels is a unit vector string. It is set that the value of the second K is equal to 1. A target group of pixels corresponding to the second K is a remaining group of pixels whose string type has not been determined according to the first K, that is, the fourth group of pixels and a group of pixels following the fourth group of pixels. In addition, the first group of pixels (that is, the $K^{th}$ group of pixels) in the target group of pixels corresponding to the second K corresponds to the fourth group of pixels in the current coding unit, and the second group of pixels (that is, the $(K+1)^{th}$ group of pixels) in the target group of pixels corresponding to the second K corresponds to the fifth group of pixels in the current coding unit. Therefore, the second K may indicate that a string in the fourth group of pixels is not a unit vector string and a string in the fifth group is a unit vector string.

In an example embodiment, the video encoding device may encode a string displacement vector of the current string to make the coding information include the string displacement vector. In a case that the current string is the unit vector string, the string displacement vector is a unit vector. The unit vector may include a first element and a second element. In a case that a scan mode of the current coding unit is a horizontal scan mode, an element value of the first element is a first value, and an element value of the second element is a second value. In a case that the scan mode of the current coding unit is a vertical scan mode, the element value of the first element is the second value, and the element value of the second element is the first value. The first value and the second value may be specifically set according to empirical values or a service requirement. For example, the first value is set to 0, and the second value is −1. In a case that the scan mode of the current coding unit is the horizontal scan mode, the unit vector is (0, −1). In a case that the scan mode of the current coding unit is the vertical scan mode, the unit vector is (−1, 0).

As can be seen from above, the current image is partitioned into a plurality of processing units, and each processing unit includes one or more coding units; the plurality of processing units include a current processing unit and an encoded processing unit, and the current processing unit includes the current coding unit. The string displacement vector is used for representing a displacement from the current string to a reference string. In a case that the current string is a unit vector string, the reference string of the current string may be allowed to not satisfy one or more conditions in the following:

(1) Any reference pixel in the reference string is within a designated area range. For example, the designated area range may be a range of the current processing unit or a range of H decoded processing units on the left of the current processing unit, H being a positive integer. In an exemplary embodiment, the value of H may be determined according to the size of a processing unit (that is, an LCU or a CTU). Specifically, H may be determined according to the following formula:

$$H=(1<<((7-\log 2\_lcu\_size\_minus2+2)<<1))-(((\log 2\_lcu\_size\_minus2+2)<7)?1:0),$$

where lcu_size represents the width or height of the processing unit, and may be specifically a positive integer greater than or equal to 1; log 2_lcu_size_minus2=log 2(lcu_size)−2. The operator "<<" represents a movement to the left, and is used for moving all binary bits of one number to the left by K (K is a positive integer greater than or equal to 1) digits, a high digit is discarded, and 0 is added to a low digit. (((Log 2_lcu_size_minus2+2)<7)?1:0) is a ternary operator. It is first determined whether ((log 2_lcu_size_minus2+2)<7) is valid. If yes, (((log 2_lcu_size_minus2+2)<7)?1:0)=1; or otherwise, (((log 2_lcu_size_minus2+2)<7)?1:0)=0. For example, if the size of the processing unit is 128×128, lcu_size=128, log 2(128)=7, log 2_lcu_size_minus2=5, and H=(1<<(0<<1))−0=1. In another example, if the size of the processing unit is equal to 64×64, lcu_size=64, log 2(64)=6, log 2_lcu_size_minus2=4, and H=(1<<(1<<1))−1=3.

Alternatively, H may be determined according to the following formula:

$$H=(1<<((7-\log 2\_lcu\_size)<<1))-(((\log 2\_lcu\_size)<7)?1:0),$$

where log 2_lcu_size=log 2(lcu_size). It is first determined whether ((log 2_lcu_size)<7) is valid. If yes, (((log 2_lcu_size)<7)?1:0)=1; or otherwise, (((log 2_lcu_size)<7)?1:0)=0.

(2) In a case that any reference pixel in the reference string is located in a decoded processing unit on the left adjacent to the current processing unit, a pixel in a target area to which a position of the any reference pixel in the reference string after being moved to the right by predetermined pixels belongs has not been reconstructed. The predetermined pixel and the target area may both be determined according to the size of a processing unit (that is, an LCU or a CTU). Specifically, in a case that the size of a processing unit is M×M, the predetermined pixel is M pixels, and the target area is a corresponding area with a size of M/2×M/2 after any pixel in the reference string has been moved to the right by M pixels.

For example, it is assumed that the size of a processing unit is 128×128, the predetermined pixel may be 128 pixels, and the target area is a corresponding area with a size of 64×64 after any pixel in the reference string has been moved to the right by 128 pixels. That a pixel in a target area to which a position of the any reference pixel in the reference string after being moved to the right by predetermined pixels belongs has not been reconstructed refers to that any pixel in the target area to which the position of the any reference pixel in the reference string after being moved to the right by predetermined pixels belongs has not been reconstructed or a pixel at an upper left corner of the target area to which the position of the any reference pixel in the reference string after being moved to the right by predetermined pixels belongs has not been reconstructed.

In an embodiment, for a reference area of any reference pixel in a reference string included in the adjacent processing unit on the left, an area at the same position may be correspondingly found in the current processing unit, and coordinates of an upper left corner of the position area are assumed not to be the same as coordinates of an upper left corner of the current CU. For example, the size of the processing unit is 128×128, and the size of the CU is 64×64. It is set that the position of any reference pixel in the reference string is (xRef, yRef). ((xRef+128)/64×64, yRef/64×64) cannot be obtained (that is, a reconstructed value of the pixel cannot be found in the first storage space), and ((xRef+128)/64×64, yRef/64×64) is assumed not to be equal to the coordinates (xCb, yCb) of the upper left corner of the current CU. "/" represents division with rounding down.

(3) Reference pixels in the reference string are located in the same alignment area, a size of the alignment area being determined according to a size of the processing unit. Specifically, the height or width of the alignment area may be represented by vSize, and it may be defined that vSize=LcuSize>=64?64:LcuSize. vSize=LcuSize>=64?64: LcuSize represents determining whether LcuSize is greater than or equal to 64, and LcuSize represents the height or width of the processing unit. If yes, vSize is equal to 64; or otherwise, vSize is equal to LcuSize.

That is, in this case, all reference pixels in a reference string pointed by a string displacement vector may only come from the same vSize×vSize alignment area. That is, the following conditions need to be satisfied:

xRefA/vSize=xRefB/vSize, and
yRefA/vSize=yRefB/vSize, where (xRefA, yRefA) and (xRefB, yRefB) are respectively coordinates of two reference pixels (luminance components) A and B in the reference string. "/" represents division with rounding down.

(4) Any reference pixel in the reference string does not belong to the current string. That is, the reference string and the current string do not overlap.

In an example embodiment, the video encoding device may encode a string scan mode flag (or referred to as a string prediction scan mode flag) to make the coding information include the string scan mode flag. Specifically, in a case that the scan mode of the current coding unit is the horizontal scan mode, the string scan mode flag is a third value; and in a case that the scan mode of the current coding unit is the vertical scan mode, the string scan mode flag is a fourth value. The third value and the fourth value may both be set according to empirical values or a service requirement. For example, the third value is set to 0, and the fourth value is set to 1.

In a case that the current string is not a unit vector string, the video encoding device may search some encoded coding units in the current processing unit and the encoded processing unit for a reference string of the current string; and acquire predicted values of pixels in the current string according to the reference string to obtain the coding information of the current coding unit. In this case, the reference string needs to satisfy one or more conditions in the following:

(1) Any reference pixel in the reference string is within a range of the current processing unit and H decoded processing units on the left of the current processing unit, H being a positive integer.

(2) In a case that any reference pixel in the reference string is located in an encoded processing unit on the left adjacent to the current processing unit, a pixel in a target area to which a position of the any reference pixel in the reference string after being moved to the right by predetermined pixels belongs has not been reconstructed.

(3) Reference pixels in the reference string are located in the same alignment area, a size of the alignment area being determined according to a size of the processing unit.

(4) Reference pixels in the reference string and the pixels in the current string are located within the same independent encoding area. The independent encoding area may include a current image or a slice in the current image.

(5) Any reference pixel in the reference string does not belong to the current string.

In a case that the current coding unit includes an unmatched pixel (that is, a pixel for which a corresponding reference pixel is not found in a reference area of an encoded area of a current image), the video encoding device may directly encode a pixel value of the unmatched pixel to make the coding information include the pixel value of the unmatched pixel.

In an encoding process in the embodiments of the disclosure, in a case that a current string of a current coding unit is a unit vector string and the current string includes a first pixel (such as a pixel in the first row of the current coding unit or a pixel in the first column of the current coding unit), a reference pixel of the first pixel may be determined from a historical decoding unit in a current image, and a predicted value of the first pixel may be acquired according to a reconstructed value of the reference pixel to implement encoding. As can be seen, in the embodiments of the disclosure, it is allowed to use a pixel in a historical decoding unit adjacent to a current coding unit as a reference pixel, so that any string in the current coding unit may be used as a unit vector string. In this way, the application range of a unit vector string may be effectively expanded, thereby helping to improve the encoding performance. In addition, a predictive coding mode used in a current coding unit is not limited to an equal value string and unit vector string submode in the embodiments of the disclosure, and may be another predictive coding mode such as a string prediction submode in an intra string copy mode. That is, in the embodiments of the disclosure, a coding unit in a string prediction submode may be allowed to use a unit vector string, so that the application range of the unit vector string may be further expanded, thereby improving the encoding performance of string prediction.

Figure 4:
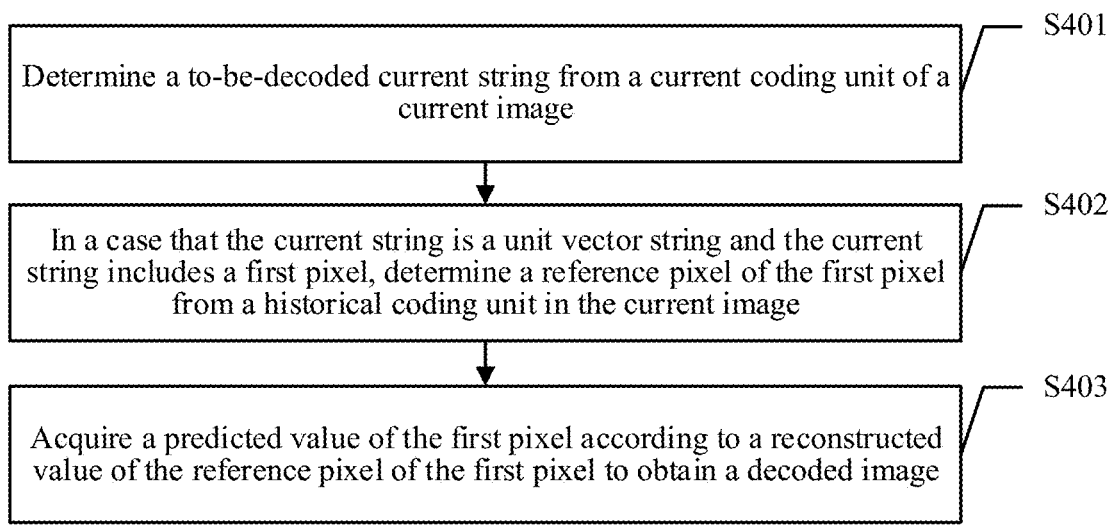
FIG. 4 is a schematic flowchart of a video decoding method according to an embodiment of the disclosure.

FIG. 4 is a flowchart of a video decoding method according to an embodiment of the disclosure. The video decoding method may be performed by the video decoding device described above or the video decoder in the video decoding device. For ease of description, an example in which the video decoding device performs the video decoding method is used for description below. As shown in FIG. 4, the video decoding method may include the following steps S401 to S403:

S401: Determine a to-be-decoded current string from a current coding unit of a current image.

In an example embodiment, the video decoding device may acquire coding information of a current coding unit of a current image. The current coding unit includes P rows and Q columns of pixels, values of P and Q being both positive integers. Next, a to-be-decoded current string may be determined from the current coding unit according to the coding information of the current coding unit. Specifically, the video decoding device may decode a predictive coding mode of the current coding unit from the coding information of the current coding unit. In a case that the predictive coding mode is a string prediction sub mode or an equal value string and unit vector string submode in ISC, a scan mode and a string length are further decoded from the coding information of the current coding unit. Next, the to-be-decoded current string may be determined from the current coding unit according to the scan mode and the string length.

A current coding unit on a decoder side is a CU to be decoded currently (that is, about to be decoded currently) or being decoded currently (that is, some decoded pixels). The current coding unit may be encoded in a string prediction submode in an intra string copy (ISC) mode. In addition, it is allowed to use a unit vector string for the coding unit in the string prediction submode. Alternatively, the current coding unit may be encoded in an equal value string and unit vector string submode in an intra string copy (ISC) mode. This is not limited in the disclosure. For ease of description, an example in which a current coding unit is encoded in a string prediction submode is used for description below.

After determining the current string, the video decoding device may determine in any following manner whether the current string is a unit vector string:

Manner 1: The video decoding device may decode a string indication flag from coding information of the current coding unit; and in a case that the string indication flag is a target value, determine that the current string is the unit vector string.

Manner 2: The video decoding device may decode a value K from coding information of the current coding unit, the value K being greater than or equal to 0, the value K being used for indicating that at least one string following a $k^{th}$ group of pixels in a target group of pixels in the current coding unit is the unit vector string, one group of pixels including one string or at least one unmatched pixel. In a case that the current string follows the $k^{th}$ group of pixels in the target group of pixels, it is determined that the current string is the unit vector string.

In an embodiment, in a case that each group of pixels includes one string, the value K may be specifically used for indicating that a $(K+1)^{th}$ string in a target group of pixels in the current coding unit is a unit vector string. In this case, it may be further determined whether the current string is the $(K+1)^{th}$ string in the target group of pixels. In a case that the current string is the $(K+1)^{th}$ string in the target group of pixels, it is determined that the current string is the unit vector string.

Manner 3: The video decoding device may decode a string displacement vector of the current string from coding information of the current coding unit; and in a case that the string displacement vector is a unit vector, determine that the current string is the unit vector string.

The unit vector may include a first element and a second element. In a case that a scan mode of the current coding unit is a horizontal scan mode, an element value of the first element is a first value, and an element value of the second element is a second value. In a case that the scan mode of the current coding unit is a vertical scan mode, the element value of the first element is the second value, and the element value of the second element is the first value. The first value and the second value may be specifically set according to empirical values or a service requirement. For example, the first value is set to 0, and the second value is −1. In a case that the scan mode of the current coding unit is the horizontal scan mode, the unit vector is (0, −1). In a case that the scan mode of the current coding unit is the vertical scan mode, the unit vector is (−1, 0).

A manner of determining the scan mode of the current coding unit may be as follows: decoding a string scan mode flag from coding information of the current coding unit; in a case that the string scan mode flag is a third value, determining that the scan mode of the current coding unit is the horizontal scan mode; and in a case that the string scan mode flag is a fourth value, determining that the scan mode of the current coding unit is the vertical scan mode.

As can be seen from above, the current image is partitioned into a plurality of processing units, and each processing unit includes one or more coding units; the plurality of processing units include a current processing unit and a decoded processing unit, and the current processing unit includes the current coding unit. The string displacement vector is used for representing a displacement from the current string to a reference string. In a case that the current string is a unit vector string, the reference string of the current string may be allowed to not satisfy one or more conditions in the following:

(1) Any reference pixel in the reference string is within a designated area range. For example, the designated area range may be a range of the current processing unit or a range of H decoded processing units on the left of the current processing unit.

(2) In a case that any reference pixel in the reference string is located in a decoded processing unit on the left adjacent to the current processing unit, a pixel in a target area to which a position of the any reference pixel in the reference string after being moved to the right by predetermined pixels belongs has not been reconstructed. In an embodiment, for a reference area of any reference pixel in a reference string included in the adjacent processing unit on the left, an area at the same position may be correspondingly found in the current processing unit, and coordinates of an upper left corner of the position area are assumed not to be the same as coordinates of an upper left corner of the current CU.

(3) Reference pixels in the reference string are located in the same alignment area.

(4) Any reference pixel in the reference string does not belong to the current string.

S402: In a case that the current string is a unit vector string and the current string includes a first pixel, determine a reference pixel of the first pixel from a historical decoding unit in the current image.

The historical decoding unit is a decoded coding unit adjacent to the current coding unit in the current image. The reference pixel corresponding to the first pixel is adjacent to the first pixel in the current image; and the first pixel meets the following condition: the reference pixel corresponding to the first pixel is not located in the current coding unit.

The historical decoding unit being adjacent to the current coding unit refers to that there is no other coding unit between the historical decoding unit and the current coding unit. The reference pixel corresponding to the first pixel being adjacent to the first pixel in the current image refers to that in the current image, a row in which the reference pixel of the first pixel is located and a row in which the first pixel is located are adjoining to each other (that is, abutting). Alternatively, the reference pixel corresponding to the first pixel being adjacent to the first pixel in the current image refers to that in the current image, a column in which the reference pixel of the first pixel is located and a column in which the first pixel is located are adjoining to each other.

It can be seen that when the first pixel and the reference pixel of the first pixel are adjacent in the current image, the first pixel is assumed to be a pixel in a critical row or a critical column in the current coding unit. The critical row may also be referred to as an edge row, and may be the first row or the last row of the current coding unit. Similarly, the critical column may also be referred to as an edge column, and may be the first column or the last column of the current coding unit. In an example embodiment, the specific meaning of the first pixel may be determined according to the scan mode of the current coding unit. For example, in a case that the scan mode of the current coding unit is the horizontal scan mode and the horizontal scan mode instructs to scan the current coding unit in the top to bottom order, the historical decoding unit is located above the current coding unit (that is, the historical decoding unit is a decoded CU that is located above the current coding unit and is adjacent to the current coding unit), and the first pixel is a pixel in the first row of the current coding unit. That is, in this case, the current string includes at least one pixel in the first row in the current coding unit. In a case that the scan mode of the current coding unit is the vertical scan mode and the vertical scan mode instructs to scan the current coding unit in the left to right order, the historical decoding unit is located on the left of the current coding unit (that is, the historical decoding unit is a decoded CU that is located on the left of the current coding unit and is adjacent to the current coding unit), and the first pixel is a pixel in the first column of the current coding unit. That is, in this case, the current string includes at least one pixel in the first column in the current coding unit.

S403: Acquire a predicted value of the first pixel according to a reconstructed value of the reference pixel of the first pixel to obtain a decoded image.

In an example embodiment, the reconstructed value of the reference pixel of the first pixel may be acquired first, and the reconstructed value of the reference pixel of the first pixel is used as the predicted value of the first pixel, to obtain the decoded image. In this decoding manner according to an example embodiment, a process of acquiring a predicted value may be simplified, thereby improving the efficiency of decoding. When different scan modes are used for the current coding unit, the reconstructed value of the reference pixel of the first pixel are acquired in different manners. For details, reference is made to the following description:

1) In a case that the scan mode of the current coding unit is the horizontal scan mode and the horizontal scan mode instructs to scan the current coding unit in the top to bottom order, the manner of acquiring the reconstructed value of the reference pixel of the first pixel includes any one of the following:

First manner: the reconstructed value of the reference pixel of the first pixel is acquired from a first storage space (or referred to as a reference pixel memory of the intra string copy mode) corresponding to an intra string copy mode.

Second manner: the reconstructed value of the reference pixel of the first pixel is acquired from a second storage space (or referred to as a reference pixel memory of the intra-prediction mode) corresponding to an intra-prediction mode.

Third manner: the current image is partitioned into a plurality of N×N areas, and in a case that the first pixel is located in the first row of any N×N area, the reconstructed value of the reference pixel of the first pixel is acquired from the second storage space, or otherwise, the reconstructed value of the reference pixel of the first pixel is acquired from the first storage space.

Pixels in the current string may all be second pixels (that is, the current string does not include the first pixel) or the current string may include the first pixel and the second pixel (that is, the current string includes the second pixel in addition to the first pixel). The second pixel is a pixel that is not in the first row of the current coding unit, and the second pixels in the current string are distributed in at least one row in the current coding unit. In this case, the computer device may derive the predicted value of each second pixel in the current string in any following manner:

Manner A: a predicted value of the second pixel in each row of the current string is acquired, row by row, with a row as a unit.

Manner B: a predicted value of each second pixel in the current string is acquired, pixel by pixel, with a single pixel as a unit.

In the foregoing manners A and B predicted value of any second pixel is acquired according to a reconstructed value of a reference pixel that is located above the second pixel and is adjacent to the second pixel.

2) In a case that the scan mode of the current coding unit is the vertical scan mode and the vertical scan instructs to scan the current coding unit in the left to right order, the manner of acquiring the reconstructed value of the reference pixel of the first pixel includes any one of the following:

First manner: the reconstructed value of the reference pixel of the first pixel is acquired from a first storage space corresponding to an intra string copy mode.

Second manner: the reconstructed value of the reference pixel of the first pixel is acquired from a second storage space corresponding to an intra-prediction mode.

Third manner: the current image is partitioned into a plurality of N×N areas, and in a case that the first pixel is located in the first column of any N×N area, the reconstructed value of the reference pixel of the first pixel is acquired from the second storage space, or otherwise, the reconstructed value of the reference pixel of the first pixel is acquired from the first storage space.

Pixels in the current string may all be third pixels (that is, the current string does not include the first pixel) or the current string may include the first pixel and the third pixel (that is, the current string includes the third pixel in addition to the first pixel). The third pixel is a pixel that is not in the first column of the current coding unit, and the third pixels in the current string are distributed in at least one column in the current coding unit. In this case, the computer device may derive the predicted value of each third pixel in the current string in any following manner:

Manner a: a predicted value of the third pixel in each column of the current string is acquired, column by column, with a column as a unit.

Manner b: a predicted value of each third pixel in the current string is acquired, pixel by pixel, with a single pixel as a unit. In the foregoing manners a and b, a predicted value of any third pixel is acquired according to a reconstructed value of a reference pixel that is located on the left of the any third pixel and is adjacent to the any third pixel.

In a case that the current string is not a unit vector string, the video decoding device may search some decoded coding units in the current processing unit and the decoded processing unit for a reference string of the current string; and acquire predicted values of pixels in the current string according to the reference string to obtain the decoded image. In this case, the reference string needs to satisfy one or more conditions in the following:

(1) Any reference pixel in the reference string is within a range of the current processing unit and H decoded processing units on the left of the current processing unit, H being a positive integer.

(2) In a case that any reference pixel in the reference string is located in an encoded processing unit on the left adjacent to the current processing unit, a pixel in a target area to which a position of the any reference pixel in the reference string after being moved to the right by predetermined pixels belongs has not been reconstructed.

(3) Reference pixels in the reference string are located in the same alignment area, a size of the alignment area being determined according to a size of the processing unit.

(4) Reference pixels in the reference string and the pixels in the current string are located within the same independent encoding area. The independent encoding area may include a current image or a slice in the current image.

(5) Any reference pixel in the reference string does not belong to the current string.

In a case that the current coding unit includes an unmatched pixel, a pixel value of the unmatched pixel may be directly decoded from coding information of the current coding unit.

In a decoding process in the embodiments of the disclosure, in a case that a current string of a current coding unit is a unit vector string and the current string includes a first pixel (such as a pixel in the first row of the current coding unit or a pixel in the first column of the current coding unit), a reference pixel of the first pixel may be determined from a historical decoding unit in a current image, and a predicted value of the first pixel may be acquired according to a reconstructed value of the reference pixel to implement decoding. As can be seen, in the embodiments of the disclosure, it is allowed to use a pixel in a historical decoding unit adjacent to a current coding unit as a reference pixel, so that any string in the current coding unit may be used as a unit vector string. In this way, the application range of a unit vector string may be effectively expanded, thereby helping to improve the decoding performance. In addition, a predictive coding mode used in a current coding unit is not limited to an equal value string and unit vector string submode in the embodiments of the disclosure, and may be another predictive coding mode such as a string prediction submode in an intra string copy mode. That is, in the embodiments of the disclosure, a coding unit in a string prediction submode may be allowed to use a unit vector string, so that the application range of the unit vector string may be further expanded, thereby improving the encoding performance of string prediction.

Based on the description of the embodiment of the foregoing video encoding method shown in FIG. 2 and the description of the embodiment of the foregoing video decoding method shown in FIG. 4, the embodiments of the disclosure provide a string prediction method based on a unit vector string. The method is applicable to a codec using an intra string copy mode, and is described below from the perspective of a decoder side.

1) The unit vector is:
   a) in a case that the scan mode of an ISC block (the current CU) is the horizontal scan mode, the unit vector is (0, −1); and
   b) in a case that the scan mode of the ISC block (the current CU) is the vertical scan mode, the unit vector is (−1, 0).

2) It may be determined in the following example manners that the current string is a unit vector string:
   a) A binary flag (that is, the string indication flag described above) is decoded from a bit stream (for example, the coding information of the current CU); and in a case that the binary flag is a target value, it is determined that the current string is the unit vector string.
   b) A value K is decoded from the bit stream (for example, the coding information of the current CU), indicating that at least one string following a $k^{th}$ group of pixels in a target group of pixels in the current coding unit is the unit vector string. In a case that the current string follows the $k^{th}$ group of pixels in the target group of pixels, it is determined that the current string is the unit vector string.
   c) A string vector (that is, a string displacement vector) of the current string is decoded from the bit stream (the coding information of the current CU); and in a case that the string vector is a unit vector, it is determined that the current string is the unit vector string.

3) Derivation of the predicted value of the unit vector string:
   a) In a case that the current ISC block (the current CU) uses a horizontal scan order
     i. The predicted value of the current string is derived, row by row, from top to bottom. For a pixel in each row of the string, a value (for example, a reconstructed value) of a pixel in a row above is used as a predicted value.
     ii. In another implementation of i., the reconstruction of the unit vector string is completed, pixel by pixel. For each pixel in the string, a value (for example, a reconstructed value) of a pixel located above the pixel is used as a predicted value.
     iii. In i. and ii., in a case that a pixel to be predicted is located in the first row of the current decoding block (that is, the current CU), a reference pixel of the pixel is located in a row above outside the current decoding block. The reconstructed value of the reference pixel is acquired in the following example manners:
       (1) The reconstructed value of the reference pixel is acquired from a reference pixel memory of intra string copy (that is, the first storage space described above).
       (2) The reconstructed value of the reference pixel is acquired from a reference pixel memory of intra-prediction (that is, the second storage space described above).
       (3) A current image is partitioned into a series of areas with a size of N×N (for example, 64×64). The reconstructed value of the reference pixel is acquired from the reference pixel memory of intra-prediction only in a case that the pixel is located in the first row of the area; or otherwise, the reconstructed value of the reference pixel is acquired from the reference pixel memory of intra string copy.
   b) In a case that the current ISC block (the current CU) uses a vertical scan order
     i. The predicted value of the current string is derived, column by column. For a pixel in each column of the string, a value (for example, a reconstructed value) of a pixel in a column on the left is used as a predicted value.
     ii. In another implementation of i., the reconstruction of the unit vector string is completed, pixel by pixel. For each pixel in the string, a value (for example, a reconstructed value) of a pixel located on the left of the pixel is used as a predicted value.
     iii. In i. and ii., in a case that a pixel to be predicted is located in the first column of the current decoding block, a reference pixel of the pixel is located in a column on the left outside the current decoding block. The reconstructed value of the reference pixel is acquired in the following example manners:
       (1) The reconstructed value of the reference pixel is acquired from a reference pixel memory of intra string copy.
       (2) The reconstructed value of the reference pixel is acquired from a reference pixel memory of intra-prediction.
       (3) A current image is partitioned into a series of areas with a size of N×N (for example, 64×64). The reconstructed value of the reference pixel is acquired from the reference pixel memory of intra-prediction in a case that the pixel is located in the first column of the area; or otherwise, the reconstructed value of the reference pixel is acquired from the reference pixel memory of intra string copy.

4) In an embodiment, it is allowed to use a unit vector string in string prediction submode with intra string copy. Unless the current string is a unit vector string, a bit stream satisfying standards is assumed to meet all or some reference range limitations as follows:
   a) any reference pixel in the reference string pointed by the string displacement vector is limited within a certain designated area range. For example, the designated area range may be a range of the current processing unit (for example, a current largest coding unit) or a range of H processing units (for example, a largest coding unit) on the left. The value of H may be determined by the size of a processing unit (for example, an LCU or a CTU). N=(1<<((7−log 2_lcu_size_minus2+2)<<1))−(((log 2_lcu_size_minus2+2)<7)?1:0).

b) In a case that any reference pixel in the reference string pointed by the string displacement vector falls in an adjacent largest coding unit on the left and the size of a luminance sample of the largest coding unit is 128×128, an upper left corner of an area with a size of 64×64 in which a position of a luminance sample of any reference pixel in the reference string after being moved to the right by 128 pixels is located has not been reconstructed. For the area with a size of 64×64 in which the any reference pixel in the reference string falls in an adjacent CTU on the left, the same area position in a current CTU may be correspondingly found. Coordinates of an upper left corner of the area with a size of 64×64 are assumed not to be the same as coordinates of an upper left corner of the current CU. That is, any position of the luminance component of the reference string is (xRef, yRef), and ((xRef+128)/64×64, yRef/64×64) cannot be obtained. ((xRef+128)/64×64, yRef/64×64) is assumed not to be equal to the coordinates (xCb, yCb) of the upper left corner of the current block.

C) Position limitation of the reference string It is defined that the size of a sample limitation area is vSize=LcuSize>=64?64:LcuSize. All pixels in a reference string pointed by a string displacement vector may only come from the same vSize×vSize alignment area. That is, xRefA/vSize=xRefB/vSize, and
yRefA/vSize=yRefB/vSize, where (xRefA, yRefA) and (xRefB, yRefB) are respectively coordinates of two luminance components A and B in the reference string.

d) any reference pixel in the reference string pointed by the string displacement vector is assumed not to be located in the current string.

The method provided in the embodiments of the disclosure expands the utilization efficiency of a unit vector string, thereby improving the coding efficiency of a string vector. In addition, a unit vector string and a string prediction submode are combined, so that the coding performance of string prediction may be further improved depending on the characteristic of low implementation complexity of a unit vector string.

Figure 5:
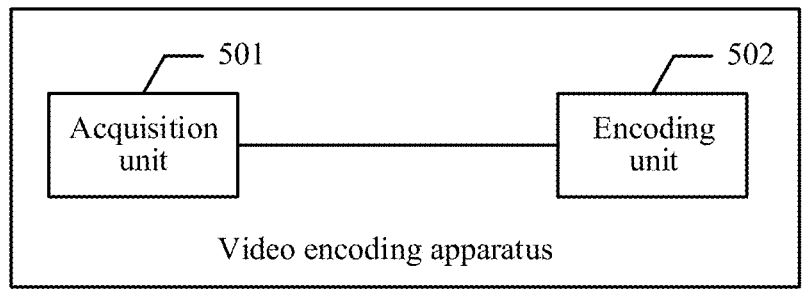
FIG. 5 is a schematic structural diagram of a video encoding apparatus according to an embodiment of the disclosure.

Based on the description of the embodiment of the foregoing video encoding method, a video encoding apparatus is further disclosed in the embodiments of the disclosure. The video encoding apparatus may be a computer program (including program code) running on the video encoding device described above. The video encoding apparatus may perform the method shown in FIG. 2. Referring to FIG. 5, the video encoding apparatus may run the following units:

an acquisition unit 501, configured to determine a to-be-encoded current string from a current coding unit of a current image; and an encoding unit 502, configured to: in a case that the current string is a unit vector string and the current string includes a first pixel, determine a reference pixel of the first pixel from a historical coding unit in the current image, the historical coding unit being an encoded coding unit adjacent to the current coding unit in the current image, the reference pixel of the first pixel being adjacent to the first pixel in the current image, the encoding unit 502 being further configured to acquire a predicted value of the first pixel according to a reconstructed value of the reference pixel of the first pixel to obtain coding information of the current coding unit.

In an implementation, the current coding unit is encoded in a string prediction submode in an intra string copy mode. In addition, it is allowed to use a unit vector string for the coding unit in the string prediction submode.

In an implementation, the encoding unit 502 may be further configured to encode the string indication flag to make the coding information include the string indication flag. In a case that the current string is a unit vector string, the string indication flag is a target value.

In another implementation, the encoding unit 502 may be further configured to encode a value K to make the coding information include the value K, the value K being greater than or equal to 0. The value K is used for indicating that at least one string following a $k^{th}$ group of pixels in a target group of pixels in the current coding unit is the unit vector string, and one group of pixels includes one string or at least one unmatched pixel.

In another implementation, in a case that each group of pixels includes one string, the value K is used for indicating that a $(K+1)^{th}$ string in the target group of pixels in the current coding unit is the unit vector string.

In another implementation, the encoding unit 502 may be further configured to encode a string displacement vector of the current string to make the coding information include the string displacement vector. In a case that the current string is the unit vector string, the string displacement vector is a unit vector.

In another implementation, the unit vector includes a first element and a second element; in a case that a scan mode of the current coding unit is a horizontal scan mode, an element value of the first element is a first value, and an element value of the second element is a second value; and in a case that the scan mode of the current coding unit is a vertical scan mode, the element value of the first element is the second value, and the element value of the second element is the first value.

In another implementation, the current image is partitioned into a plurality of processing units, and each processing unit includes one or more coding units; the plurality of processing units include a current processing unit and an encoded processing unit, and the current processing unit includes the current coding unit; and the string displacement vector is used for representing a displacement from the current string to a reference string, and the reference string is allowed to not satisfy one or more conditions in the following:

any reference pixel in the reference string is within a designated area range;

in a case that any reference pixel in the reference string is located in a decoded processing unit on the left adjacent to the current processing unit, a pixel in a target area to which a position of the any reference pixel in the reference string after being moved to the right by predetermined pixels belongs has not been reconstructed;

reference pixels in the reference string are located in the same alignment area, a size of the alignment area being determined according to a size of the processing unit; and any reference pixel in the reference string does not belong to the current string.

In another implementation, the current coding unit includes P rows and Q columns of pixels, values of P and Q being both positive integers; in a case that a scan mode of the current coding unit is a horizontal scan mode and the horizontal scan mode instructs to scan the current coding unit in a top to bottom order, the historical coding unit is located above the current coding unit, and the first pixel is a pixel in the first row of the current coding unit.

In this case, in a case that pixels in the current string are all second pixels, or the current string includes the first pixel and the second pixel; and the second pixel is a pixel that is not in the first row of the current coding unit, and the second pixels in the current string are distributed in at least one row in the current coding unit; and correspondingly, the encoding unit 502 may be further configured to:

acquire a predicted value of the second pixel in each row of the current string, row by row, with a row as a unit; or acquire a predicted value of each second pixel in the current string, pixel by pixel, with a single pixel as a unit, a predicted value of any second pixel being acquired according to a reconstructed value of a reference pixel that is located above the any second pixel and is adjacent to the any second pixel.

In another implementation, the current coding unit includes P rows and Q columns of pixels, values of P and Q being both positive integers; in a case that a scan mode of the current coding unit is a vertical scan mode and the vertical scan mode instructs to scan the current coding unit in a left to right order, the historical coding unit is located on the left of the current coding unit, and the first pixel is a pixel in the first column of the current coding unit.

In this case, in a case that pixels in the current string are all third pixels, or the current string includes the first pixel and the third pixel; and the third pixel is a pixel that is not in the first column of the current coding unit, and the third pixels in the current string are distributed in at least one column in the current coding unit; and correspondingly, the encoding unit 502 may be further configured to:

acquire a predicted value of the third pixel in each column of the current string, column by column, with a column as a unit; or acquire a predicted value of each third pixel in the current string, pixel by pixel, with a single pixel as a unit, a predicted value of any third pixel being acquired according to a reconstructed value of a reference pixel that is located on the left of the any third pixel and is adjacent to the any third pixel.

In another implementation, a manner of acquiring the reconstructed value of the reference pixel of the first pixel includes any one of the following:

acquiring the reconstructed value of the reference pixel of the first pixel from a first storage space corresponding to an intra string copy mode;

acquiring the reconstructed value of the reference pixel of the first pixel from a second storage space corresponding to an intra-prediction mode; and partitioning the current image into a plurality of N×N areas, and in a case that the first pixel is located in the first row of any N×N area, acquiring the reconstructed value of the reference pixel of the first pixel from the second storage space, or otherwise, acquiring the reconstructed value of the reference pixel of the first pixel from the first storage space.

In another implementation, the encoding unit 502 may be further configured to encode a string scan mode flag to make the coding information include the string scan mode flag. In a case that the scan mode of the current coding unit is the horizontal scan mode, the string scan mode flag is a third value; and in a case that the scan mode of the current coding unit is the vertical scan mode, the string scan mode flag is a fourth value.

In another implementation, the current image is partitioned into a plurality of processing units, and each processing unit includes one or more coding units; the plurality of processing units include a current processing unit and an encoded processing unit, and the current processing unit includes the current coding unit; and correspondingly, the encoding unit 502 may be further configured to:

in a case that the current string is not the unit vector string, search some encoded coding units in the current processing unit and the encoded processing unit for a reference string of the current string; and acquire predicted values of pixels in the current string according to the reference string to obtain the coding information of the current coding unit.

In another implementation, the reference string needs to satisfy one or more conditions in the following:

any reference pixel in the reference string is within a range of the current processing unit and H encoded processing units on the left of the current processing unit, H being a positive integer;

in a case that any reference pixel in the reference string is located in an encoded processing unit on the left adjacent to the current processing unit, a pixel in a target area to which a position of the any reference pixel in the reference string after being moved to the right by predetermined pixels belongs has not been encoded;

reference pixels in the reference string are located in the same alignment area, a size of the alignment area being determined according to a size of the processing unit; and reference pixels in the reference string and the pixels in the current string are located within the same independent encoding area; and any reference pixel in the reference string does not belong to the current string.

In another implementation, the encoding unit 502 may be further configured to:

in a case that the current coding unit includes an unmatched pixel, encode a pixel value of the unmatched pixel to make the coding information include the pixel value of the unmatched pixel.

According to an embodiment of the disclosure, the steps in the method shown in FIG. 2 may all be performed by the units in the video encoding apparatus shown in FIG. 5. For example, step S201 shown in FIG. 2 may be performed by the acquisition unit 501 shown in FIG. 5, and steps S202 and S203 may be performed by the encoding unit 502 shown in FIG. 5.

According to another embodiment of the disclosure, units in the video encoding apparatus shown in FIG. 5 may be separately or wholly combined into one or several other units, or one (or more) of the units herein may further be divided into multiple units of smaller functions. In this way, same operations may be implemented, and implementation of the technical effects of the embodiments of the disclosure is not affected. The foregoing units are divided based on logical functions. In an actual application, a function of one unit may also be implemented by a plurality of units, or functions of a plurality of units are implemented by one unit. In other embodiments of the disclosure, the video encoding apparatus may also include other units. During actual application, the functions may also be cooperatively implemented by other units and may be cooperatively implemented by a plurality of units.

According to another embodiment of the disclosure, a computer program (including program code) that may perform the steps in the corresponding method shown in FIG. 2 may run on a general computing device, such as a computer, which include processing elements and storage elements such as a central processing unit (CPU), a random access memory (RAM), and a read-only memory (ROM), to construct the video encoding apparatus shown in FIG. 5, and implement the video encoding method in the embodiments of the disclosure. The computer program may be recorded in, for example, a computer readable recording medium, and may be loaded into the foregoing computing device by using the computer readable recording medium, and run in the computing device.

In an encoding process in the embodiments of the disclosure, in a case that a current string of a current coding unit is a unit vector string and the current string includes a first pixel (such as a pixel in the first row of the current coding unit or a pixel in the first column of the current coding unit), a reference pixel of the first pixel may be determined from a historical decoding unit in a current image, and a predicted value of the first pixel may be acquired according to a reconstructed value of the reference pixel to implement encoding. As can be seen, in the embodiments of the disclosure, it is allowed to use a pixel in a historical decoding unit adjacent to a current coding unit as a reference pixel, so that any string in the current coding unit may be used as a unit vector string. In this way, the application range of a unit vector string may be effectively expanded, thereby helping to improve the encoding performance. In addition, a predictive coding mode used in a current coding unit is not limited to an equal value string and unit vector string submode in the embodiments of the disclosure, and may be another predictive coding mode such as a string prediction submode in an intra string copy mode. That is, in the embodiments of the disclosure, a coding unit in a string prediction submode may be allowed to use a unit vector string, so that the application range of the unit vector string may be further expanded, thereby improving the encoding performance of string prediction.

Figure 6:
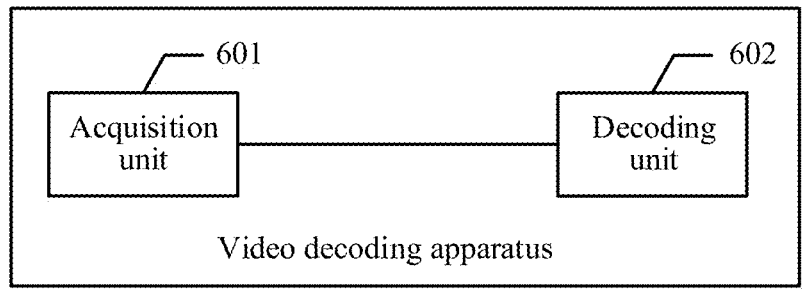
FIG. 6 is a schematic structural diagram of a video decoding apparatus according to an embodiment of the disclosure.

Based on the description of the embodiment of the foregoing video decoding method, a video decoding apparatus is further disclosed in the embodiments of the disclosure. The video decoding apparatus may be a computer program (including program code) running on the video decoding device described above. The video decoding apparatus may perform the method shown in FIG. 4. Referring to FIG. 6, the video decoding apparatus may run the following units:

an acquisition unit 601, configured to determine a to-be-decoded current string from a current coding unit of a current image; and a decoding unit 602, configured to: in a case that the current string is a unit vector string and the current string includes a first pixel, determine a reference pixel of the first pixel from a historical decoding unit in the current image, the historical decoding unit being a decoded coding unit adjacent to the current coding unit in the current image, the reference pixel of the first pixel being adjacent to the first pixel in the current image, the decoding unit 602 being further configured to acquire a predicted value of the first pixel according to a reconstructed value of the reference pixel of the first pixel to obtain a decoded image.

In an implementation, the current coding unit is encoded in a string prediction submode in an intra string copy mode. In addition, it is allowed to use a unit vector string for the coding unit in the string prediction submode.

In another implementation, the decoding unit 602 may be further configured to:

decode a string indication flag from coding information of the current coding unit; and in a case that the string indication flag is a target value, determine that the current string is the unit vector string.

In another implementation, the decoding unit 602 may be further configured to:

decode a value K from coding information of the current coding unit, the value K being greater than or equal to 0, the value K being used for indicating that at least one string following a $k^{th}$ group of pixels in a target group of pixels in the current coding unit is the unit vector string, one group of pixels including one string or at least one unmatched pixel; and determine, in a case that the current string follows the $k^{th}$ group of pixels in the target group of pixels, that the current string is the unit vector string.

In another implementation, in a case that each group of pixels includes one string, the value K is used for indicating that a $(K+1)^{th}$ string in the target group of pixels in the current coding unit is the unit vector string.

Correspondingly, when being configured to determine, in a case that the current string follows the $k^{th}$ group of pixels in the target group of pixels, that the current string is the unit vector string, the decoding unit 602 may be further configured to:

determine, in a case that the current string is the $(K+1)^{th}$ string in the target group of pixels, that the current string is the unit vector string.

In another implementation, the decoding unit 602 may be further configured to:

decode a string displacement vector of the current string from coding information of the current coding unit; and in a case that the string displacement vector is a unit vector, determine that the current string is the unit vector string.

In another implementation, the unit vector includes a first element and a second element; in a case that a scan mode of the current coding unit is a horizontal scan mode, an element value of the first element is a first value, and an element value of the second element is a second value; and in a case that the scan mode of the current coding unit is a vertical scan mode, the element value of the first element is the second value, and the element value of the second element is the first value.

In another implementation, the current image is partitioned into a plurality of processing units, and each processing unit includes one or more coding units; the plurality of processing units include a current processing unit and a decoded processing unit, and the current processing unit includes the current coding unit; and the string displacement vector is used for representing a displacement from the current string to a reference string, and the reference string is allowed to not satisfy one or more conditions in the following:

any reference pixel in the reference string is within a designated area range;

in a case that any reference pixel in the reference string is located in a decoded processing unit on the left adjacent to the current processing unit, a pixel in a target area to which a position of the any reference pixel in the reference string after being moved to the right by predetermined pixels belongs has not been reconstructed;

reference pixels in the reference string are located in the same alignment area, a size of the alignment area being determined according to a size of the processing unit; and any reference pixel in the reference string does not belong to the current string.

In another implementation, the current coding unit includes P rows and Q columns of pixels, values of P and Q being both positive integers; in a case that a scan mode of the current coding unit is a horizontal scan mode and the horizontal scan mode instructs to scan the current coding unit in a top to bottom order, the historical decoding unit is located above the current coding unit, and the first pixel is a pixel in the first row of the current coding unit.

In this case, in a case that pixels in the current string are all second pixels, or the current string includes the first pixel and the second pixel; and the second pixel is a pixel that is not in the first row of the current coding unit, and the second pixels in the current string are distributed in at least one row in the current coding unit; and correspondingly, the decoding unit 602 may be further configured to:

acquire a predicted value of the second pixel in each row of the current string, row by row, with a row as a unit; or acquire a predicted value of each second pixel in the current string, pixel by pixel, with a single pixel as a unit, a predicted value of any second pixel being acquired according to a reconstructed value of a reference pixel that is located above the any second pixel and is adjacent to the any second pixel.

In another implementation, the current coding unit includes P rows and Q columns of pixels, values of P and Q being both positive integers; in a case that a scan mode of the current coding unit is a vertical scan mode and the vertical scan mode instructs to scan the current coding unit in a left to right order, the historical decoding unit is located on the left of the current coding unit, and the first pixel is a pixel in the first column of the current coding unit.

In this case, in a case that pixels in the current string are all third pixels, or the current string includes the first pixel and the third pixel; and the third pixel is a pixel that is not in the first column of the current coding unit, and the third pixels in the current string are distributed in at least one column in the current coding unit; and correspondingly, the decoding unit 602 may be further configured to:

acquire a predicted value of the third pixel in each column of the current string, column by column, with a column as a unit; or acquire a predicted value of each third pixel in the current string, pixel by pixel, with a single pixel as a unit, a predicted value of any third pixel being acquired according to a reconstructed value of a reference pixel that is located on the left of the any third pixel and is adjacent to the any third pixel.

In another implementation, a manner of acquiring the reconstructed value of the reference pixel of the first pixel includes any one of the following:

acquiring the reconstructed value of the reference pixel of the first pixel from a first storage space corresponding to an intra string copy mode;

acquiring the reconstructed value of the reference pixel of the first pixel from a second storage space corresponding to an intra-prediction mode; and partitioning the current image into a plurality of N×N areas, and in a case that the first pixel is located in the first column of any N×N area, acquiring the reconstructed value of the reference pixel of the first pixel from the second storage space, or otherwise, acquiring the reconstructed value of the reference pixel of the first pixel from the first storage space.

In another implementation, the decoding unit 602 may be further configured to:

decode a string scan mode flag from coding information of the current coding unit;

in a case that the string scan mode flag is a third value, determine that the scan mode of the current coding unit is the horizontal scan mode; and in a case that the string scan mode flag is a fourth value, determine that the scan mode of the current coding unit is the vertical scan mode.

In another implementation, the current image is partitioned into a plurality of processing units, and each processing unit includes one or more coding units; the plurality of processing units include a current processing unit and a decoded processing unit, and the current processing unit includes the current coding unit; and correspondingly, the decoding unit 602 may be further configured to:

in a case that the current string is not the unit vector string, search some decoded coding units in the current processing unit and the decoded processing unit for a reference string of the current string; and acquire predicted values of pixels in the current string according to the reference string to obtain the decoded image.

In another implementation, the reference string needs to satisfy one or more conditions in the following:

any reference pixel in the reference string is within a range of the current processing unit and H decoded processing units on the left of the current processing unit, H being a positive integer;

in a case that any reference pixel in the reference string is located in a decoded processing unit on the left adjacent to the current processing unit, a pixel in a target area to which a position of the any reference pixel in the reference string after being moved to the right by predetermined pixels belongs has not been reconstructed;

reference pixels in the reference string are located in the same alignment area, a size of the alignment area being determined according to a size of the processing unit; and reference pixels in the reference string and the pixels in the current string are located within the same independent decoding area; and any reference pixel in the reference string does not belong to the current string.

In another implementation, in a case that the current coding unit includes an unmatched pixel, a pixel value of the unmatched pixel is decoded from coding information of the current coding unit.

According to an embodiment of the disclosure, the steps in the method shown in FIG. 4 may all be performed by the units in the video decoding apparatus shown in FIG. 6. For example, step S401 shown in FIG. 4 may be performed by the acquisition unit 501 shown in FIG. 6, and steps S402 and S403 may be performed by the decoding unit 602 shown in FIG. 6.

According to another embodiment of the disclosure, units in the video decoding apparatus shown in FIG. 6 may be separately or wholly combined into one or several other units, or one (or more) of the units herein may further be divided into multiple units of smaller functions. In this way, same operations may be implemented, and implementation of the technical effects of the embodiments of the disclosure is not affected. The foregoing units are divided based on logical functions. In an actual application, a function of one unit may also be implemented by a plurality of units, or functions of a plurality of units are implemented by one unit. In other embodiments of the disclosure, the video decoding apparatus may also include other units. During actual application, the functions may also be cooperatively implemented by other units and may be cooperatively implemented by a plurality of units.

According to another embodiment of the disclosure, a computer program (including program code) that may perform the steps in the corresponding method shown in FIG. 4 may run on a general computing device, such as a computer, which include processing elements and storage elements such as a central processing unit (CPU), a random access memory (RAM), and a read-only memory (ROM), to construct the video decoding apparatus shown in FIG. 6, and implement the video decoding method in the embodiments of the disclosure. The computer program may be recorded in, for example, a computer readable recording medium, and may be loaded into the foregoing computing device by using the computer readable recording medium, and run in the computing device.

In a decoding process in the embodiments of the disclosure, in a case that a current string of a current coding unit is a unit vector string and the current string includes a first pixel (such as a pixel in the first row of the current coding unit or a pixel in the first column of the current coding unit), a reference pixel of the first pixel may be determined from a historical decoding unit in a current image, and a predicted value of the first pixel may be acquired according to a reconstructed value of the reference pixel to implement decoding. As can be seen, in the embodiments of the disclosure, it is allowed to use a pixel in a historical decoding unit adjacent to a current coding unit as a reference pixel, so that any string in the current coding unit may be used as a unit vector string. In this way, the application range of a unit vector string may be effectively expanded, thereby helping to improve the decoding performance. In addition, a predictive coding mode used in a current coding unit is not limited to an equal value string and unit vector string submode in the embodiments of the disclosure, and may be another predictive coding mode such as a string prediction submode in an intra string copy mode. That is, in the embodiments of the disclosure, a coding unit in a string prediction submode may be allowed to use a unit vector string, so that the application range of the unit vector string may be further expanded, thereby improving the encoding performance of string prediction.

Figure 7:
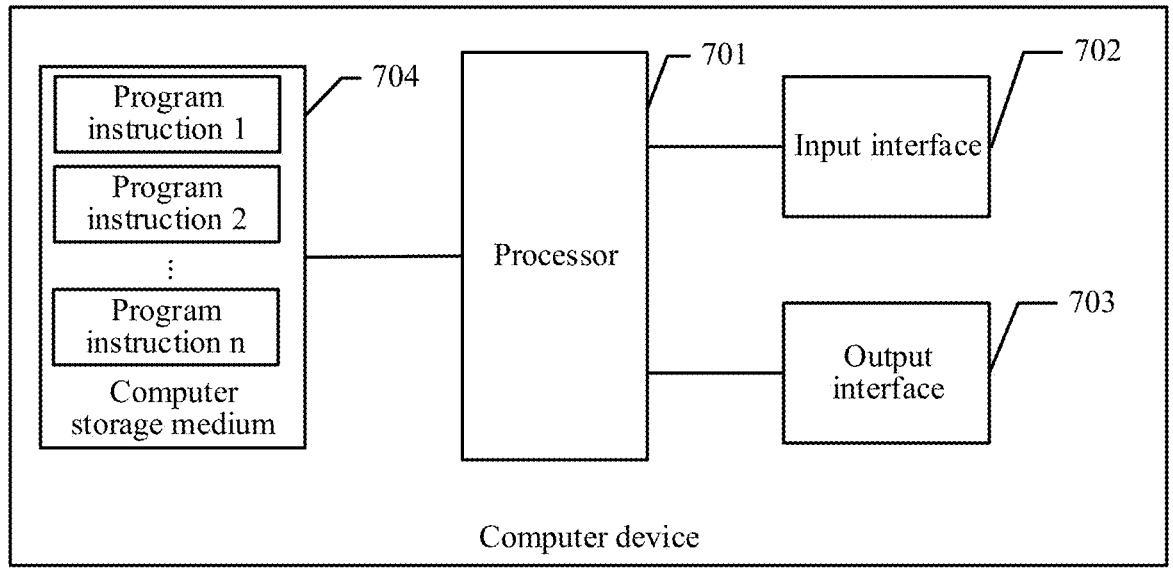
FIG. 7 is a schematic structural diagram of a computer device according to an embodiment of the disclosure.

Based on the descriptions of the foregoing method embodiments and apparatus embodiments, the embodiments of the disclosure further provide a computer device. The computer device may be the video encoding device described above or the video decoding device described above. Referring to FIG. 7, the computer device may include at least a processor 701, an input interface 702, an output interface 703, and a computer storage medium 704. The processor 701, the input interface 702, the output interface 703, and the computer storage medium 704 in the computer device may be connected by a bus or in another manner. In an embodiment, in a case that the computer device is the video encoding device described above, the computer device may further include a video encoder. In a case that the computer device is the video decoding device described above, the computer device may further include a video decoder.

The computer storage medium 704 may be stored in a memory of the computer device. The computer storage medium 704 is configured to store a computer program. The computer program includes program instructions. The processor 701 is configured to execute the program instructions stored in the computer storage medium 704. The processor 701 (or referred to as a central processing unit (CPU)) is a computing core and a control core of the computer device, is suitable for implementing one or more instructions, and is specifically suitable for loading and executing one or more instructions to implement a corresponding method procedure or a corresponding function. In an embodiment, in a case that the computer device is a video encoding device, the processor 701 in the embodiments of the disclosure may be configured to perform related method steps of the foregoing video encoding method shown in FIG. 2. In another implementation, in a case that the computer device is a video decoding device, the processor 701 in the embodiments of the disclosure may be configured to perform related method steps of the foregoing video decoding method shown in FIG. 4.

The embodiments of the disclosure further provide a computer storage medium, and the computer storage medium is a memory device in a computer device and is configured to store programs and data. It would be understood that the computer storage medium herein may include an internal storage medium of the computer device and certainly may also include an extended storage medium supported by the computer device. The computer storage medium provides storage space, and the storage space stores an operating system of the computer device. In addition, the storage space further stores one more programs instructions suitable for being loaded and executed by the processor 1001. The instructions may be one or more computer programs (including program code). The computer storage medium herein may be a high-speed RAM or a non-volatile memory, for example, at least one magnetic disk memory. In an embodiment, the computer storage medium may further be at least one computer storage medium located away from the foregoing processor.

In an embodiment, in a case that the computer device is the video decoding device described above, one or more first instructions stored in the computer storage medium may be loaded and executed by the processor 701 to implement corresponding steps of the method in the embodiment of the foregoing video decoding method shown in FIG. 4. In an example embodiment, the one or more first instructions in the computer storage medium are loaded by the processor 701 to perform the video encoding method shown in FIG. 2 or the video decoding method shown in FIG. 4.

According to an aspect of the disclosure, a computer program product or a computer program is further provided, the computer program product or the computer program including computer instructions, the computer instructions being stored in a computer-readable storage medium. A processor of a computer device reads the computer instructions from the computer-readable storage medium, and executes the computer instructions, so that the computer device performs the methods provided any one of various example embodiments according to the aspects of the foregoing video encoding method shown in FIG. 2 or video decoding method shown in FIG. 4.

In addition, what is disclosed above is merely exemplary embodiments of the disclosure, and certainly is not intended to limit the scope of the claims of the disclosure. Therefore, equivalent variations made in accordance with the claims of the disclosure shall fall within the scope of the disclosure.

What is claimed is:

1. A video decoding method, performed by a computer device, and comprising:
    determining a current string to be decoded from a current coding unit of a current image;

based on the current string being a unit vector string and the current string comprising a first pixel, determining a reference pixel of the first pixel from a historical decoding unit in the current image, the historical decoding unit being a decoded coding unit adjacent to the current coding unit in the current image, the reference pixel of the first pixel being adjacent to the first pixel in the current image;

acquiring a predicted value of the first pixel based on a reconstructed value of the reference pixel of the first pixel to obtain a decoded image; and decoding a value K from coding information of the current coding unit, the value K being greater than or equal to 0, the value K being used for indicating that at least one string following a $k^{th}$ group of pixels in a target group of pixels in the current coding unit is the unit vector string, one group of pixels comprising one string or at least one unmatched pixel; and determining, based on the current string following the $k^{th}$ group of pixels in the target group of pixels, that the current string is the unit vector string, wherein based on each group of pixels comprising one string, the value K is used for indicating that a $(K+1)^{th}$ string in the target group of pixels in the current coding unit is the unit vector string, and wherein the determining that the current string is the unit vector string comprises:

determining, based on the current string being the $(K+1)^{th}$ string in the target group of pixels, that the current string is the unit vector string.

2. The method according to claim 1, wherein the current coding unit is encoded in a string prediction submode in an intra string copy mode; and a coding unit in the string prediction submode is allowed to use the unit vector string.

3. The method according to claim 1, further comprising:

decoding a string indication flag from the coding information of the current coding unit; and based on the string indication flag being a target value, determining that the current string is the unit vector string.

4. The method according to claim 1, further comprising:

decoding a string displacement vector of the current string from the coding information of the current coding unit; and based on the string displacement vector being a unit vector, determining that the current string is the unit vector string.

5. The method according to claim 4, wherein the unit vector comprises a first element and a second element;

based on a scan mode of the current coding unit being a horizontal scan mode, an element value of the first element is a first value, and an element value of the second element is a second value; or based on the scan mode of the current coding unit being a vertical scan mode, the element value of the first element is the second value, and the element value of the second element is the first value.

6. The method according to claim 4, wherein the current image is partitioned into a plurality of processing units, and each processing unit comprises one or more coding units; the plurality of processing units comprise a current processing unit and a decoded processing unit, and the current processing unit comprises the current coding unit;

the string displacement vector is used for representing a displacement from the current string to a reference string, and the reference string is allowed to not satisfy one or more conditions in the following:

a given reference pixel in the reference string is within a designated area range;

based on the given reference pixel in the reference string being located in the decoded processing unit on a left adjacent to the current processing unit, a pixel in a target area to which a position of the given reference pixel in the reference string, after being moved to right by predetermined pixels, belongs has not been reconstructed;

reference pixels in the reference string are located in a same alignment area, a size of the alignment area being determined based on a size of the processing unit; and a given reference pixel in the reference string does not belong to the current string.

7. The method according to claim 1, wherein the current coding unit comprises P rows and Q columns of pixels, values of P and Q being both positive integers; and based on a scan mode of the current coding unit being a horizontal scan mode and the horizontal scan mode instructs to scan the current coding unit in a top to bottom order, the historical decoding unit is located above the current coding unit, and the first pixel is a pixel in a first row of the current coding unit.

8. The method according to claim 7, wherein a manner of acquiring the reconstructed value of the reference pixel of the first pixel comprises any one of the following:

acquiring the reconstructed value of the reference pixel of the first pixel from a first storage space corresponding to an intra string copy mode;

acquiring the reconstructed value of the reference pixel of the first pixel from a second storage space corresponding to an intra-prediction mode; and partitioning the current image into a plurality of N×N areas, and based on the first pixel being located in the first row of any N×N area, acquiring the reconstructed value of the reference pixel of the first pixel from the second storage space, or otherwise, acquiring the reconstructed value of the reference pixel of the first pixel from the first storage space.

9. The method according to claim 7, wherein all of pixels in the current string are second pixels, or the current string comprises the first pixel and a second pixel; and the second pixel is a pixel that is not in the first row of the current coding unit, and the second pixels in the current string are distributed in at least one row in the current coding unit;

the method further comprising:

acquiring a predicted value of the second pixel in each row of the current string, row by row, with a row as a unit; or acquiring a predicted value of each second pixel in the current string, pixel by pixel, with a single pixel as a unit, a predicted value of a given second pixel being acquired based on a reconstructed value of a reference pixel that is located above the given second pixel and is adjacent to the given second pixel.

10. The method according to claim 1, wherein the current coding unit comprises P rows and Q columns of pixels, values of P and Q being both positive integers; and based on a scan mode of the current coding unit being a vertical scan mode and the vertical scan mode instructs to scan the current coding unit in a left to right order, the historical decoding unit is located on a left of the current coding unit, and the first pixel is a pixel in a first column of the current coding unit.

11. The method according to claim 10, wherein a manner of acquiring the reconstructed value of the reference pixel of the first pixel comprises any one of the following:
   acquiring the reconstructed value of the reference pixel of the first pixel from a first storage space corresponding to an intra string copy mode;
   acquiring the reconstructed value of the reference pixel of the first pixel from a second storage space corresponding to an intra-prediction mode; and
   partitioning the current image into a plurality of N×N areas, and based on the first pixel being located in the first column of any N×N area, acquiring the reconstructed value of the reference pixel of the first pixel from the second storage space, or otherwise, acquiring the reconstructed value of the reference pixel of the first pixel from the first storage space.

12. The method according to claim 10, wherein all of pixels in the current string are third pixels, or the current string comprises the first pixel and a third pixel; and the third pixel is a pixel that is not in the first column of the current coding unit, and the third pixels in the current string are distributed in at least one column in the current coding unit;
   the method further comprising:
   acquiring a predicted value of the third pixel in each column of the current string, column by column, with a column as a unit; or
   acquiring a predicted value of each third pixel in the current string, pixel by pixel, with a single pixel as a unit,
   a predicted value of a given third pixel being acquired based on a reconstructed value of a reference pixel that is located on a left of the given third pixel and is adjacent to the given third pixel.

13. The method according to claim 1, wherein the current coding unit comprises P rows and Q columns of pixels, values of P and Q being both positive integers,
   the method further comprising:
   decoding a string scan mode flag from the coding information of the current coding unit;
   based on the string scan mode flag being a third value, determining that a scan mode of the current coding unit is a horizontal scan mode; or
   based on the string scan mode flag being a fourth value, determining that the scan mode of the current coding unit is a vertical scan mode.

14. The method according to claim 1, wherein the current image is partitioned into a plurality of processing units, and each processing unit comprises one or more coding units; the plurality of processing units comprise a current processing unit and a decoded processing unit, and the current processing unit comprises the current coding unit;
   the method further comprising:
   based on the current string being not the unit vector string, searching some decoded coding units in the current processing unit and the decoded processing unit for a reference string of the current string; and
   acquiring predicted values of pixels in the current string according to the reference string to obtain the decoded image.

15. The method according to claim 14, wherein the reference string satisfies one or more conditions in the following:
   a given reference pixel in the reference string is within a range of the current processing unit and H decoded processing units on a left of the current processing unit, H being a positive integer;
   based on the given reference pixel in the reference string being located in the decoded processing unit on a left adjacent to the current processing unit, a pixel in a target area to which a position of the given reference pixel in the reference string after being moved to right by predetermined pixels belongs has not been reconstructed;
   reference pixels in the reference string are located in a same alignment area, a size of the alignment area being determined based on a size of the processing unit; and
   the reference pixels in the reference string and the pixels in the current string are located within a same independent decoding area; and
   a given reference pixel in the reference string does not belong to the current string.

16. The method according to claim 1, wherein based on the current coding unit comprising an unmatched pixel, a pixel value of the unmatched pixel is decoded from the coding information of the current coding unit.

17. A video encoding method, performed by a computer device, and comprising:
   determining a current string to be encoded from a current coding unit of a current image;
   based on the current string being a unit vector string and the current string comprising a first pixel, determining a reference pixel of the first pixel from a historical coding unit in the current image, the historical coding unit being an encoded coding unit adjacent to the current coding unit in the current image, the reference pixel of the first pixel being adjacent to the first pixel in the current image;
   acquiring a predicted value of the first pixel according to a reconstructed value of the reference pixel of the first pixel to obtain coding information of the current coding unit;
   decoding a value K from the coding information of the current coding unit, the value K being greater than or equal to 0, the value K being used for indicating that at least one string following a $k^{th}$ group of pixels in a target group of pixels in the current coding unit is the unit vector string, one group of pixels comprising one string or at least one unmatched pixel; and
   determining, based on the current string following the $k^{th}$ group of pixels in the target group of pixels, that the current string is the unit vector string,
   wherein based on each group of pixels comprising one string, the value K is used for indicating that a $(K+1)^{th}$ string in the target group of pixels in the current coding unit is the unit vector string, and
   wherein the determining that the current string is the unit vector string comprises:
   determining, based on the current string being the $(K+1)^{th}$ string in the target group of pixels, that the current string is the unit vector string.

18. A video decoding apparatus, comprising:
   at least one memory configured to store program code; and
   at least one processor configured to read the program code and operate as instructed by the program code, the program code including:
   acquisition code configured to cause the at least one processor to determine a current string to be decoded from a current coding unit of a current image; and
   decoding code configured to cause the at least one processor to: based on the current string being a unit vector string and the current string comprising a first pixel, determine a reference pixel of the first pixel from a historical decoding unit in the current image, the historical decoding unit being a decoded coding unit adjacent to the current coding unit in the current image, the reference pixel of the first pixel being adjacent to the first pixel in the current image, the decoding code being further configured to cause the at least one processor to:

acquire a predicted value of the first pixel based on a reconstructed value of the reference pixel of the first pixel to obtain a decoded image;

decode a value K from coding information of the current coding unit, the value K being greater than or equal to 0, the value K being used for indicating that at least one string following a $k^{th}$ group of pixels in a target group of pixels in the current coding unit is the unit vector string, one group of pixels comprising one string or at least one unmatched pixel; and determine, based on the current string following the $k^{th}$ group of pixels in the target group of pixels, that the current string is the unit vector string, wherein based on each group of pixels comprising one string, the value K is used for indicating that a $(K+1)^{th}$ string in the target group of pixels in the current coding unit is the unit vector string, and wherein the determining that the current string is the unit vector string comprises:

determining, based on the current string being the $(K+1)^{th}$ string in the target group of pixels, that the current string is the unit vector string.

\* \* \* \* \*